(12) United States Patent
Hong et al.

(10) Patent No.: US 11,560,441 B2
(45) Date of Patent: Jan. 24, 2023

(54) METHOD FOR PREPARING POLYOLEFIN USING SUPPORTED HYBRID METALLOCENE CATALYST

(71) Applicant: LG Chem, Ltd., Seoul (KR)

(72) Inventors: Bog Ki Hong, Daejeon (KR); Jin Young Park, Daejeon (KR); Si Jung Lee, Daejeon (KR); Yi Young Choi, Daejeon (KR); Soung Hun Yoo, Daejeon (KR); Sunghyun Park, Daejeon (KR); Chang Woan Han, Daejeon (KR); Sun Mi Kim, Daejeon (KR)

(73) Assignee: LG Chem, Ltd.

( * ) Notice: Subject to any disclaimer, the term of this patent is extended or adjusted under 35 U.S.C. 154(b) by 34 days.

(21) Appl. No.: 16/957,925

(22) PCT Filed: Jan. 9, 2019

(86) PCT No.: PCT/KR2019/000354
§ 371 (c)(1),
(2) Date: Jun. 25, 2020

(87) PCT Pub. No.: WO2019/139355
PCT Pub. Date: Jul. 18, 2019

(65) Prior Publication Data
US 2021/0061930 A1 Mar. 4, 2021

(30) Foreign Application Priority Data

Jan. 11, 2018 (KR) .................. 10-2018-0004040
Jan. 8, 2019 (KR) .................. 10-2019-0002462

(51) Int. Cl.
| | | |
|---|---|---|
| *C08F 4/653* | (2006.01) | |
| *C08F 4/6592* | (2006.01) | |
| *C08F 110/02* | (2006.01) | |
| *C08L 23/06* | (2006.01) | |
| *C08F 2/30* | (2006.01) | |
| *C08F 4/52* | (2006.01) | |
| *C08F 4/642* | (2006.01) | |
| *C08F 4/649* | (2006.01) | |
| *C08F 4/659* | (2006.01) | |
| *C08F 8/22* | (2006.01) | |
| *C08L 23/28* | (2006.01) | |
| *C08L 27/06* | (2006.01) | |

(52) U.S. Cl.
CPC .............. *C08F 110/02* (2013.01); *C08F 2/30* (2013.01); *C08F 4/52* (2013.01); *C08F 4/642* (2013.01); *C08F 4/649* (2013.01); *C08F 4/65904* (2013.01); *C08F 4/65912* (2013.01); *C08F 4/65916* (2013.01); *C08F 4/65922* (2013.01); *C08F 4/65927* (2013.01); *C08F 8/22* (2013.01); *C08L 23/286* (2013.01); *C08L 27/06* (2013.01); *C08L 23/06* (2013.01); *C08L 2201/02* (2013.01); *C08L 2201/08* (2013.01); *C08L 2203/18* (2013.01); *C08L 2314/06* (2013.01)

(58) Field of Classification Search
CPC ................ C08F 4/65904; C08F 110/02; C08F 210/16
See application file for complete search history.

(56) References Cited

U.S. PATENT DOCUMENTS

| | | |
|---|---|---|
| 5,032,562 A | 7/1991 | Lo et al. |
| 5,525,678 A | 6/1996 | Mink et al. |
| 5,914,289 A | 6/1999 | Razavi |
| 6,111,046 A | 8/2000 | Resconi et al. |
| 6,221,992 B1 | 4/2001 | Galimberti et al. |
| 6,448,351 B1 | 9/2002 | Galimberti et al. |
| 6,472,484 B1 | 10/2002 | Abe et al. |
| 2012/0245021 A1 | 9/2012 | Razavi |
| 2015/0011719 A1 | 1/2015 | Mariott et al. |
| 2016/0222144 A1 | 8/2016 | Kum et al. |
| 2017/0029542 A1 | 2/2017 | Mariott et al. |

(Continued)

FOREIGN PATENT DOCUMENTS

| | | |
|---|---|---|
| CA | 2112598 A1 | 7/1994 |
| CN | 101143954 A | 3/2008 |
| CN | 107075007 A | 8/2017 |
| EP | 0632066 A1 | 1/1995 |
| EP | 0729984 A1 | 9/1996 |
| JP | H06256369 A | 9/1994 |
| JP | H11279221 A | 10/1999 |

(Continued)

OTHER PUBLICATIONS

International Search Report for PCT/KR2019/000354 dated Apr. 30, 2019; 2 pages.
Search Report dated May 31, 2022 from the Office Action for Chinese Application No. 201980006507.9 dated Jun. 8, 2022, pp. 1-2.

*Primary Examiner* — Caixia Lu
(74) *Attorney, Agent, or Firm* — Lerner, David, Littenberg, Krumholz & Mentlik, LLP

(57) ABSTRACT

The present disclosure relates to a method for preparing a polyolefin using a supported hybrid metallocene catalyst. According to the present disclosure, a polyolefin having a narrow molecular weight distribution can be prepared very effectively by introducing a cocatalyst in an optimum content in the presence of a supported hybrid metallocene catalyst containing two or more metallocene compounds having a specific chemical structure. The polyolefin prepared according to the present disclosure exhibits excellent uniformity in chlorine distribution in polyolefin during chlorination, thereby significantly improving elongation of the chlorinated polyolefin, compatibility with PVC and impact reinforcing performance. Thus, it exhibits excellent chemical resistance, weather resistance, flame retardancy, processability and impact strength reinforcing effect, and can be suitably applied as an impact reinforcing agent for PVC pipes and window profiles.

13 Claims, No Drawings

(56) References Cited

U.S. PATENT DOCUMENTS

| | | | |
|---|---|---|---|
| 2017/0198074 A1* | 7/2017 | Hong | C08F 210/16 |
| 2017/0291969 A1* | 10/2017 | Lee | C08F 110/02 |
| 2017/0298538 A1* | 10/2017 | Bae | C08F 4/65908 |

FOREIGN PATENT DOCUMENTS

| | | | |
|---|---|---|---|
| KR | 20020026155 A | 4/2002 | |
| KR | 20070068363 A | 6/2007 | |
| KR | 20070075991 A | 7/2007 | |
| KR | 20140138823 A | 12/2014 | |
| KR | 20150037591 A | 4/2015 | |
| KR | 20150063885 A | 6/2015 | |
| KR | 20150145066 A | 12/2015 | |
| KR | 20160045434 A | 4/2016 | |
| KR | 20160067508 A | 6/2016 | |
| KR | 20170106110 A | 9/2017 | |

* cited by examiner

METHOD FOR PREPARING POLYOLEFIN USING SUPPORTED HYBRID METALLOCENE CATALYST

CROSS-REFERENCE TO RELATED APPLICATIONS

This application is a national phase entry under 35 U.S.C. § 371 of International Application No. PCT/KR2019/000354 filed Jan. 9, 2019, which claims priority from Korean Patent Applications No. 10-2018-0004040 filed Jan. 11, 2018, and No. 10-2019-0002462 filed Jan. 8, 2019, all of which are incorporated herein by reference.

TECHNICAL FIELD

The present disclosure relates to a method for preparing a polyolefin using a supported hybrid metallocene catalyst.

BACKGROUND

Olefin polymerization catalyst systems may be divided into Ziegler-Natta and metallocene catalysts, and these highly active catalyst systems have been developed in accordance with their characteristics. Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties. In particular, the broad molecular weight distribution can cause a decrease in physical properties due to polymer chains having a relatively low molecular weight.

Meanwhile, the metallocene catalyst includes a main catalyst having a metallocene compound as a main component and an organometallic compound cocatalyst having aluminum as a main component. The stereoregularity, copolymerization characteristics, molecular weight, crystallinity, etc. of the resulting polymer may be controlled by changing a ligand structure of the catalyst and polymerization conditions.

In U.S. Pat. No. 5,032,562, a method for preparing a polymerization catalyst by supporting two different transition metal catalysts on one support is disclosed. This catalyst is prepared by supporting a titanium (Ti)-based Ziegler-Natta catalyst which produces a high molecular weight polymer and a zirconium (Zr)-based metallocene catalyst which produces a low molecular weight polymer on one support, and results in a bimodal molecular weight distribution. This catalyst is disadvantageous in that the supporting procedure is complicated and morphology of polymers is poor due to a cocatalyst.

In U.S. Pat. No. 5,525,678, a method for using a catalyst system for olefin polymerization is disclosed, in which a metallocene compound and a non-metallocene compound are simultaneously supported on a support to realize simultaneous polymerization of a high molecular weight polymer and a low molecular weight polymer. However, there are disadvantages that the metallocene compound and non-metallocene compound must be separately supported and the support must be pretreated with various compounds for supporting.

In U.S. Pat. No. 5,914,289, a method for controlling a molecular weight and a molecular weight distribution of polymers using metallocene catalysts which are respectively supported on supports are disclosed. However, a large amount of solvent and a long period of time are required to prepare the supported catalysts, and a process of supporting metallocene catalysts on the respective supports is troublesome.

Moreover, according to these prior arts, it is difficult to effectively prepare polyolefins, particularly ethylene (co) polymers, which simultaneously satisfy a desired level of density and narrow molecular weight distribution.

In particular, chlorinated polyolefins such as chlorinated polyethylene (CPE) are widely used for an impact reinforcing agent for pipes and window profiles by compounding with PVC, and are generally prepared by reacting polyethylene with chlorine in a suspension, or by reacting polyethylene with chlorine in aqueous HCl solution. This PVC compound product requires excellent impact strength, and the strength of the compound varies depending on physical properties of the chlorinated polyolefin. In the case of general-purpose chlorinated polyolefins which are widely known at present, since a polyolefin prepared using Ziegler-Natta catalyst is applied, the uniformity in chlorine distribution is decreased in the polyolefin due to the broad molecular weight distribution. There is also a disadvantage in that the impact strength is insufficient when compounded with PVC.

Accordingly, excellent uniformity in chlorine distribution is required in the chlorinated polyolefin in order to improve impact strength of PVC compound. Thus, there is a continuous demand for developing a method for preparing a polyolefin having a narrow molecular weight distribution.

DETAILED DESCRIPTION OF THE INVENTION

Technical Problem

The present disclosure is to provide a method for preparing a polyolefin having a narrow molecular weight distribution more easily and effectively in order to improve impact strength of PVC compound.

The present disclosure is also to provide a method for preparing a chlorinated polyolefin in which a chlorination reaction is further performed after preparing the polyolefin by the above method.

The present disclosure is also to provide a PVC composition including the chlorinated polyolefin prepared by the above method and polyvinyl chloride (PVC).

Technical Solution

According to one embodiment of the present disclosure, there is provided a method for preparing a polyolefin, including the step of polymerizing olefinic monomers in the presence of a supported metallocene catalyst in which at least one first metallocene compound represented by the following Chemical Formula 1 and at least one second metallocene compound represented by the following Chemical Formula 2 are supported on a support, and a cocatalyst while introducing the cocatalyst at 70 cc/hr to 140 cc/hr:

$$(Cp^1R^a)_n(Cp^2R^b)M^1Z^1_{3-n} \qquad \text{[Chemical Formula 1]}$$

in Chemical Formula 1, $M^1$ is a Group 4 transition metal;

$Cp^1$ and $Cp^2$ are the same as or different from each other, and are each independently selected from the group consisting of indenyl and 4,5,6,7-tetrahydro-1-indenyl radical, which may be substituted with C1 to C20 hydrocarbon;

$R^a$ and $R^b$ are the same as or different from each other, and are each independently hydrogen, substituted or unsubstituted C1 to C20 alkyl, substituted or unsubstituted C1 to C10 alkoxy, substituted or unsubstituted C2 to C20 alkoxyalkyl, substituted or unsubstituted C6 to C20 aryl, substituted or unsubstituted C6 to C10 aryloxy, substituted or unsubstituted C2 to C20 alkenyl, substituted or unsubstituted C7 to C40 alkylaryl, substituted or unsubstituted C7 to C40 arylalkyl, substituted or unsubstituted C8 to C40 arylalkenyl, or substituted or unsubstituted C2 to C10 alkynyl;

$Z^1$ are each independently a halogen, substituted or unsubstituted C1 to C20 alkyl, substituted or unsubstituted C2 to C20 alkenyl, substituted or unsubstituted C7 to C40 alkylaryl, substituted or unsubstituted C7 to C40 arylalkyl, substituted or unsubstituted C6 to C20 aryl, substituted or unsubstituted C1 to C20 alkylidene, a substituted or unsubstituted amino group, substituted or unsubstituted C2 to C20 alkylalkoxy, or substituted or unsubstituted C7 to C40 arylalkoxy; and n is 1 or 0;

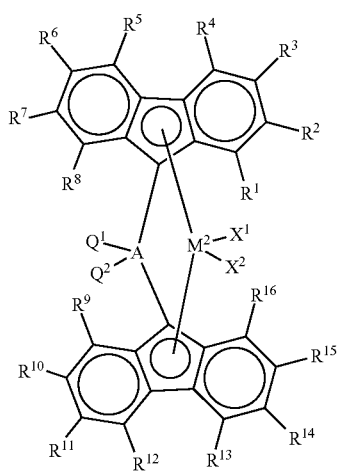

[Chemical Formula 2]

in Chemical Formula 2, $Q^1$ and $Q^2$ are the same as or different from each other, and are each independently substituted or unsubstituted C1 to C20 alkyl, substituted or unsubstituted C1 to C10 alkoxy, substituted or unsubstituted C2 to C20 alkoxyalkyl, or substituted or unsubstituted C6 to C20 aryl;

A is at least one or a combination of radicals containing carbon, germanium, or silicon atom;

$M^2$ is a Group 4 transition metal;

$X^1$ and $X^2$ are the same as or different from each other, and are each independently a halogen, substituted or unsubstituted C1 to C20 alkyl, substituted or unsubstituted C2 to C10 alkenyl, substituted or unsubstituted C7 to C40 alkylaryl, substituted or unsubstituted C7 to C40 arylalkyl, substituted or unsubstituted C6 to C20 aryl, substituted or unsubstituted C1 to C20 alkylidene, a substituted or unsubstituted amino group, substituted or unsubstituted C2 to C20 alkylalkoxy, or substituted or unsubstituted C7 to C40 arylalkoxy;

$R^1$ to $R^{16}$ are the same as or different from each other, and are each independently hydrogen, a halogen, substituted or unsubstituted C1 to C20 alkyl, substituted or unsubstituted C2 to C20 alkenyl, substituted or unsubstituted C1 to C20 alkylsilyl, substituted or unsubstituted C1 to C20 silylalkyl, substituted or unsubstituted C1 to C20 alkoxysilyl, substituted or unsubstituted C1 to C10 alkoxy, substituted or unsubstituted C2 to C20 alkoxyalkyl, substituted or unsubstituted C6 to C20 aryl, substituted or unsubstituted C6 to C10 aryloxy, substituted or unsubstituted C7 to C40 alkylaryl, substituted or unsubstituted C7 to C40 arylalkyl, substituted or unsubstituted C8 to C40 arylalkenyl, or substituted or unsubstituted C2 to C10 alkynyl, and two or more substituents adjacent to each other of $R^1$ to $R^{16}$ may be connected with each other to form a substituted or unsubstituted aliphatic or aromatic ring; and at least one of $R^1$ to $R^8$ is represented by the following Chemical Formula 3, and at least one of $R^9$ to $R^{16}$ is represented by the Chemical Formula 3, $-L^1-D^1$ [Chemical Formula 3]

in Chemical Formula 3, $L^1$ is C1 to C10 alkylene, and $D^1$ is C6 to C20 aryl, C4 to C20 cycloalkyl, or C2 to C20 alkoxyalkyl.

The present disclosure also provides a polyolefin prepared according to the method as described above.

In addition, the present disclosure provides a method for preparing a chlorinated polyolefin including the step of chlorinating the polyolefin with chlorine.

The present disclosure also provides a chlorinated polyolefin prepared according to the method as described above.

Further, the present disclosure provides a PVC composition including the chlorinated polyolefin and polyvinyl chloride (PVC).

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the method for preparing a polyolefin and the polyolefin prepared therefrom, the method for preparing a chlorinated polyolefin and the chlorinated polyolefin prepared therefrom, and a PVC composition including the chlorinated polyolefin will be described in more detail.

I. Method for Preparing Polyolefin and Polyolefin

According to one embodiment of the present disclosure, there is provided a method for preparing a polyolefin, including the step of polymerizing olefinic monomers in the presence of a supported metallocene catalyst in which at least one first metallocene compound represented by the Chemical Formula 1 and at least one second metallocene compound represented by the Chemical Formula 2 are supported on a support, and a cocatalyst while introducing the cocatalyst at 70 cc/hr to 140 cc/hr.

According to the present disclosure, when performing an olefin polymerization by optimizing input of the cocatalyst using a supported hybrid catalyst including specific metallocene compounds, a polyolefin having a narrow molecular weight distribution can be effectively produced, wherein the polyolefin exhibits excellent uniformity in chlorine distribution in the chlorinated polyolefin to improve impact strength of PVC compound.

Meanwhile, according to one embodiment of the present disclosure, the polymerization reaction is performed in the presence of a supported metallocene catalyst in which at least one first metallocene compound represented by the following Chemical Formula 1 and at least one second metallocene compound represented by the following Chemical Formula 2 are supported on a support.

$(Cp^1R^a)_n(Cp^2R^b)M^1Z^1_{3-n}$ [Chemical Formula 1]

in Chemical Formula 1, $M^1$ is a Group 4 transition metal;

$Cp^1$ and $Cp^2$ are the same as or different from each other, and are each independently selected from the group consisting of indenyl and 4,5,6,7-tetrahydro-1-indenyl radical, which may be substituted with C1 to C20 hydrocarbon;

$R^a$ and $R^b$ are the same as or different from each other, and are each independently hydrogen, substituted or unsubstituted C1 to C20 alkyl, substituted or unsubstituted C1 to C10 alkoxy, substituted or unsubstituted C2 to C20 alkoxyalkyl, substituted or unsubstituted C6 to C20 aryl, substituted or unsubstituted C6 to C10 aryloxy, substituted or unsubstituted C2 to C20 alkenyl, substituted or unsubstituted C7 to C40 alkylaryl, substituted or unsubstituted C7 to C40 arylalkyl, substituted or unsubstituted C8 to C40 arylalkenyl, or substituted or unsubstituted C2 to C10 alkynyl;

$Z^1$ are each independently a halogen, substituted or unsubstituted C1 to C20 alkyl, substituted or unsubstituted C2 to C20 alkenyl, substituted or unsubstituted C7 to C40 alkylaryl, substituted or unsubstituted C7 to C40 arylalkyl, substituted or unsubstituted C6 to C20 aryl, substituted or unsubstituted C1 to C20 alkylidene, a substituted or unsubstituted amino group, substituted or unsubstituted C2 to C20 alkylalkoxy, or substituted or unsubstituted C7 to C40 arylalkoxy; and n is 1 or 0;

[Chemical Formula 2]

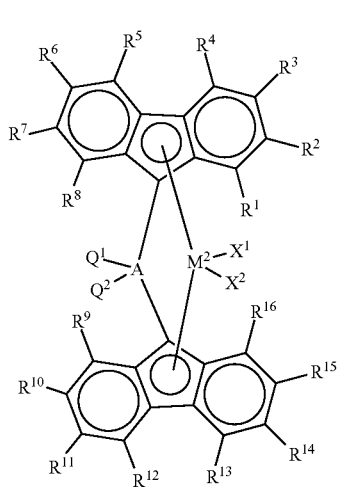

in Chemical Formula 2, $Q^1$ and $Q^2$ are the same as or different from each other, and are each independently substituted or unsubstituted C1 to C20 alkyl, substituted or unsubstituted C1 to C10 alkoxy, substituted or unsubstituted C2 to C20 alkoxyalkyl, or substituted or unsubstituted C6 to C20 aryl;

A is at least one or a combination of radicals containing carbon, germanium, or silicon atom;

$M^2$ is a Group 4 transition metal;

$X^1$ and $X^2$ are the same as or different from each other, and are each independently a halogen, substituted or unsubstituted C1 to C20 alkyl, substituted or unsubstituted C2 to C10 alkenyl, substituted or unsubstituted C7 to C40 alkylaryl, substituted or unsubstituted C7 to C40 arylalkyl, substituted or unsubstituted C6 to C20 aryl, substituted or unsubstituted C1 to C20 alkylidene, a substituted or unsubstituted amino group, substituted or unsubstituted C2 to C20 alkylalkoxy, or substituted or unsubstituted C7 to C40 arylalkoxy;

$R^1$ to $R^{16}$ are the same as or different from each other, and are each independently hydrogen, a halogen, substituted or unsubstituted C1 to C20 alkyl, substituted or unsubstituted C2 to C20 alkenyl, substituted or unsubstituted C1 to C20 alkylsilyl, substituted or unsubstituted C1 to C20 silylalkyl, substituted or unsubstituted C1 to C20 alkoxysilyl, substituted or unsubstituted C1 to C10 alkoxy, substituted or unsubstituted C2 to C20 alkoxyalkyl, substituted or unsubstituted C6 to C20 aryl, substituted or unsubstituted C6 to C10 aryloxy, substituted or unsubstituted C7 to C40 alkylaryl, substituted or unsubstituted C7 to C40 arylalkyl, substituted or unsubstituted C8 to C40 arylalkenyl, or substituted or unsubstituted C2 to C10 alkynyl, and two or more substituents adjacent to each other of $R^1$ to $R^{16}$ may be connected with each other to form a substituted or unsubstituted aliphatic or aromatic ring; and at least one of $R^1$ to $R^8$ is represented by the following Chemical Formula 3, and at least one of $R^9$ to $R^{16}$ is represented by the Chemical Formula 3, -$L^1$-$D^1$ [Chemical Formula 3]

in Chemical Formula 3, $L^1$ is C1 to C10 alkylene, and $D^1$ is C6 to C20 aryl, C4 to C20 cycloalkyl, or C2 to C20 alkoxyalkyl.

The substituents of Chemical Formulae 1 and 2 of the supported hybrid metallocene catalyst usable in the method for preparing a polyolefin according to the present disclosure will be described in more detail.

The C1 to C20 alkyl group may include a linear, branched, or cyclic alkyl group, and specifically, it may be a methyl group (Me), an ethyl group (Et), a propyl group (Pr), an isopropyl group, an n-butyl group (n-Bu), a tert-butyl group (t-Bu), a pentyl group (Pt), a hexyl group (Hx), a heptyl group, an octyl group, a cyclobutyl group, a cyclopentyl group, a cyclohexyl group, or the like, but is not limited thereto.

The C1 to C20 alkylene group may include a linear or branched alkylene group, and specifically, it may be a methylene group, an ethylene group, a propylene group, a butylene group, a pentylene group, a hexylene group, or the like, but is not limited thereto.

The C4 to C20 cycloalkyl group refers to a cyclic alkyl group among the alkyl groups as described above, and specifically, it may be a cyclobutyl group, a cyclopentyl group, a cyclohexyl group, or the like, but is not limited thereto.

The C2 to C20 alkenyl group may include a linear or branched alkenyl group, and specifically, it may be an allyl group, an ethenyl group, a propenyl group, a butenyl group, a pentenyl group, or the like, but is not limited thereto.

The C6 to C20 aryl group may include a single ring aryl group or a condensed ring aryl group, and specifically, it may be a phenyl group, a biphenyl group, a naphthyl group, a phenanthrenyl group, a fluorenyl group, or the like, but is not limited thereto.

The C1 to C20 alkoxy group may be a methoxy group, an ethoxy group, a phenyloxy group, a cyclohexyloxy group, or the like, but is not limited thereto.

The C2 to C20 alkoxyalkyl group is a functional group in which at least one hydrogen of the alkyl group is substituted with an alkoxy group, and specifically, it may be an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, a tert-butoxyhexyl group; or an aryloxyalkyl group such as a phenoxyhexyl group, but is not limited thereto.

The C1 to C20 alkylsilyl group or the C1 to C20 alkoxysilyl group is a functional group in which 1 to 3 hydrogens of $-SiH_3$ are substituted with 1 to 3 alkyl groups or alkoxy groups described above, and specifically, it may be an alkylsilyl group such as a methylsilyl group, a dimethylsilyl group, a trimethylsilyl group, a dimethylethylsilyl group, a diethylmethylsilyl group or a dimethylpropylsilyl group; an alkoxysilyl group such as a methoxysilyl group, a dimethoxysilyl group, a trimethoxysilyl group or a dimethoxyethoxysilyl group; or an alkoxyalkylsilyl group such as a methoxydimethylsilyl group, a diethoxymethylsilyl group or a dimethoxypropylsilyl group, but it is not limited thereto.

The C1 to C20 silylalkyl group is a functional group in which at least one hydrogen of the alkyl group is substituted with a silyl group, and specifically, it may be $-CH_2-SiH_3$, a methylsilylmethyl group or a dimethylethoxysilylpropyl group, or the like, but it is not limited thereto.

The halogen may be fluorine (F), chlorine (Cl), bromine (Br) or iodine (I).

The sulfonate group has a structure of $-O-SO_2-R'$, wherein R' may be a C1 to C20 hydrocarbyl group. Specifically, the C1 to C20 sulfonate group may include a methanesulfonate group, a phenylsulfonate group, or the like, but is not limited thereto.

In addition, in the present disclosure, "two substituents adjacent to each other are connected with each other to form an aliphatic or aromatic ring" means that the atom(s) of the two substituents and the atom(s) to which the two substituents are bonded are connected with each other to form a ring. Specifically, adjacent substituents of $R^1$ to $R^{16}$, for example, $R^2$ and $R^3$ or $R^3$ and $R^4$ may be connected with each other to form an aromatic ring.

The above-mentioned substituents may be optionally substituted with one or more substituents selected from the group consisting of a hydroxyl group; a halogen; an alkyl or alkenyl, aryl, alkoxy group; an alkyl or alkenyl, aryl, alkoxy group containing at least one heteroatom of Group 14 to 16 heteroatoms; a silyl group; an alkylsilyl or alkoxysilyl group; a phosphine group; a phosphide group; a sulfonate group; and a sulfone group.

The Group 4 transition metal may be titanium (Ti), zirconium (Zr), hafnium (Hf), or the like, but it is not limited thereto.

Conventionally, olefin polymers prepared by using a catalyst in which a transition metal compound having a cyclopentyl radical as a ligand is supported have exhibited a problem of controlling molecular weight distribution. Accordingly, the polyolefins prepared by using a catalyst in which a transition metal compound having a cyclopentyl radical as a ligand is supported have a broad molecular weight distribution, and thus it has been difficult to produce a chlorinated polyolefin with high elongation during chlorination.

However, as described in the embodiment of the present disclosure, when performing olefin polymerization by using a supported hybrid catalyst including the metallocene compounds represented by the Chemical Formula 1 and Chemical Formula 2, a polyolefin having a narrow molecular weight distribution can be effectively produced, wherein the polyolefin exhibits excellent uniformity in chlorine distribution in the chlorinated polyolefin to improve impact strength of PVC compound.

Specifically, in the supported hybrid catalyst, the first metallocene compound can easily prepare a polyolefin containing long chain branch and having a low molecular weight. And, the second metallocene compound can easily prepare a polyolefin containing a smaller amount of long chain branch and having a relatively high molecular weight compared to the first metallocene compound. In particular, when the polymer has a large amount of long chain branch and a large molecular weight, melt strength is increased. In the case of the first metallocene compound, there is a limit in improving it because the molecular weight is low as compared with many long chain branches.

In the preparation of a polyolefin of the present disclosure, the first metallocene compound that prepares a polymer having a relatively large amount of long chain branch and a low molecular weight, and the second metallocene compound that prepares a polymer having a relatively small amount amount of long chain branch and a high molecular weight are hybrid-supported to effectively control a molecular weight distribution while maintaining a high molecular weight. As the long chain branch present in the polymer is located on the relatively low molecular weight side by hybrid-supporting the two metallocene compounds, the molecular weight distribution can be improved.

More specifically, the first metallocene compound represented by the Chemical Formula 1 has a structure including an indenyl-based ligand, and the catalyst with this structure may polymerize a polymer having a relatively narrow molecular weight distribution (PDI, MWD, Mw/Mn) and melt flow rate ratio (MFRR), while having a small amount of long chain branch.

Specifically, the indenyl or 4,5,6,7-tetrahydro-1-indenyl radical ligand in the structure of the first metallocene compound represented by the Chemical Formula 1 may affect, for example, the activity of olefin polymerization.

In Chemical Formula 1, $M_1$ may be Ti, Zr or Hf; $R^a$ and $R^b$ are the same as or different from each other, and may each independently be hydrogen, C1 to C20 alkyl, C2 to C20 alkoxyalkyl, or C7 to C40 arylalkyl; and $Z^1$ may be a halogen. Alternatively, in Chemical Formula 1, $Cp^1$ and $Cp^2$ may each independently be indenyl, or 4,5,6,7-tetrahydro-1-indenyl; $R^a$ and $R^b$ may each independently be hydrogen, methyl, or tert-butoxy hexyl; $M_1$ may be Zr; and $Z^1$ may be a halogen such as chlorine. In this case, the supported hybrid catalyst can prepare an olefin polymer having excellent processability.

Specific examples of the first metallocene compound represented by the Chemical Formula 1 may include bis(3-(6-(tert-butoxy)hexyl)-1H-inden-1-yl)zirconium (IV) chloride and bis(3-(6-(tert-butoxy)hexyl)-4,5,6,7-tetrahydro-1H-inden-1-yl)zirconium(IV) chloride, but the present disclosure is not limited thereto.

The first metallocene compound represented by the Chemical Formula 1 may be synthesized by applying known reactions. Specifically, the metallocene compound may be prepared by preparing a ligand compound through various synthesis processes and then performing metallation with a metal precursor compound. However, the present disclosure is not limited thereto, and the synthesis method can be referred to Examples.

In the supported hybrid catalyst, the second metallocene compound represented by the Chemical Formula 2 includes a specific substituent (a cyclopentylmethyl group) in the ligand, and the ligand has a structure cross-linked by Si or the like. The catalyst with this structure may polymerize a polymer having a relatively narrow molecular weight distribution (PDI, MWD, Mw/Mn) and melt flow rate ratio (MFRR), while having a small amount of long chain branch.

Specifically, the molecular weight of the olefin polymer to be prepared can be easily controlled by adjusting the degree of steric hindrance effect depending on the type of the substituted functional groups in the second metallocene compound represented by the Chemical Formula 2.

Specifically, in Chemical Formula 2, $M^2$ may be Ti, Zr or Hf; A may be carbon, germanium, or silicon; $Q^1$ and $Q^2$ may each independently be C1 to C20 alkyl, or C2 to C20 alkoxyalkyl; $R^2$ or $R^7$ may be represented by the following Chemical Formula 3a, $R^{10}$ or $R^{15}$ may be represented by the following Chemical Formula 3a, and the rest of $R^1$ to $R^{16}$ may be hydrogen, a halogen, or C1 to C20 alkyl; and $X^1$ and $X^2$ may each independently be a halogen. In this case, the supported hybrid catalyst can prepare an olefin polymer having excellent processability.

-$L^2$-$D^2$ [Chemical Formula 3a]

in Chemical Formula 3a, $L^2$ is C1 to C10 alkylene, and $D^2$ is C6 to C20 aryl, or C4 to C20 cycloalkyl.

Alternatively, in Chemical Formula 2, $M^2$ may be Zr; A may be silicon; $Q^1$, and $Q^2$ may each independently be methyl, ethyl, propyl, or tert-butoxyhexyl; $R^2$ or $R^7$ may be represented by the following Chemical Formula 3b, $R^{10}$ or $R^{15}$ may be represented by the following Chemical Formula 3b, and the rest of $R^1$ to $R^{16}$ may be hydrogen; and $X^1$ and $X^2$ may each independently be a halogen. In particular, $R^2$ and $R^{15}$ may be represented by the following Chemical Formula 3b, and $R^1$, $R^3$ to $R^{14}$, and $R^{16}$ may be hydrogen.

-$L^3$-$D^3$ [Chemical Formula 3b]

in Chemical Formula 3b, $L^3$ is C1 to C2 alkylene, and $D^3$ is C6 to C8 aryl or C5 to C6 cycloalkyl.

Specific examples of the second metallocene compound represented by the Chemical Formula 2 may include dichloro[[[6-(tert-butoxy)hexyl]methylsilylene]bis[(4a,4b,8a,9,9a-η)-2-(cyclopentylmethyl)-9H-fluoren-9-ylidene]] zirconium, dichloro[[[6-(tert-butoxy)hexyl]methylsilylene]bis[(4a,4b,8a,9,9a-η)-2-(phenylmethyl)-9H-fluoren-9-ylidene]] zirconium, and dichloro[[[6-(tert-butoxy)hexyl]methylsilylene]bis[(4a,4b,8a,9,9a-η)-2-(cyclohexylmethyl)-9H-fluoren-9-ylidene]] zirconium, but the present disclosure is not limited thereto.

The second metallocene compound represented by the Chemical Formula 2 may be synthesized by applying known reactions. Specifically, the metallocene compound may be prepared by preparing a ligand compound through various synthesis processes and then performing metallation with a metal precursor compound. However, the present disclosure is not limited thereto, and the synthesis method can be referred to Examples.

As such, the supported hybrid metallocene catalyst includes the first and second metallocene compounds, and thus, may effectively prepare a polyolefin having a high molecular weight of a linear polymer with a narrow molecular weight distribution while exhibiting excellent processability In particular, a mixing molar ratio of the first metallocene compound and the second metallocene compound may be about 1:1 to 1:3 or about 1:1 to 1:2. The mixing molar ratio of the first metallocene compound and the second metallocene compound may be 1:1 or more to control the molecular weight, and may be 1:3 or less for high activity.

Meanwhile, the method for preparing a polyolefin according to the present disclosure may produce a polyolefin having a narrow molecular weight distribution, a chlorinated polyolefin exhibiting excellent uniformity in chlorine distribution, and a PVC composition having improved impact strength through performing an olefin polymerization by optimizing input of the cocatalyst using a supported hybrid catalyst including specific metallocene compounds as described above.

Specifically, the polymerization reaction for preparing a polyolefin in the present disclosure should be performed in the presence of a cocatalyst in order to prevent a decrease in catalytic activity by moisture in the polymerization solvent, and the cocatalyst is introduced at about 70 cc/hr to about 140 cc/hr. Specifically, the cocatalyst may be introduced at about 80 cc/hr to 135 cc/hr, about 90 cc/hr to 130 cc/hr, or about 90 cc/hr to 110 cc/hr. The input amount of the cocatalyst gas should be about 70 cc/hr or more in order to completely remove the moisture in the polymerization solvent, and should be about 140 cc/hr or less in order to prevent a decrease in activity caused by the reaction of the cocatalyst itself with the catalyst.

The cocatalyst is an organometallic compound containing a Group 13 metal and is not particularly limited as long as it can be used in the polymerization of olefins in the presence of a general metallocene catalyst.

The polymerization reaction may be carried out using a continuous slurry polymerization reactor, a loop slurry reactor, a gas phase reactor, or a solution reactor. And the reaction may be a homopolymerization of an olefin-based monomer or copolymerization of two or more monomers. However, according to the method of the embodiment, it is more appropriate to polymerize olefinic monomers by a slurry polymerization or a gas phase polymerization in order to more effectively control the molecular weight distribution.

In particular, the polymerization reaction may be carried out by a slurry phase polymerization in a hydrocarbon-based solvent (for example, an aliphatic hydrocarbon-based solvent such as hexane, butane, or pentane). As the first and second metallocene compounds according to the present disclosure have excellent solubility in aliphatic hydrocarbon-based solvents, they are stably dissolved and supplied to the reaction system, and thus the polymerization reaction can be effectively progressed.

In addition, the preparation method of a polyolefin according to one embodiment of the present disclosure may be performed in a single-CSTR reactor.

In the polymerization reactor, the polymerization may proceed in the presence of an inert gas such as nitrogen. The inert gas may prolong the reaction activity of the metallocene compound included in the catalyst by inhibiting a rapid reaction of the metallocene catalyst at the beginning of the polymerization reaction.

In the polymerization reaction, hydrogen gas may be used for the purpose of controlling the molecular weight and molecular weight distribution of the polyolefin.

The polymerization may be carried out a temperature of about 70° C. to about 100° C., about 80° C. to about 90° C., or about 81° C. or about 83° C. When the polymerization temperature is too low, a polymerization rate and productivity may be reduced. Conversely, when the polymerization temperature is too high, a fouling phenomenon may occur in the reactor.

In addition, a polymerization pressure may be about 6.8 kg/cm² to about 8.7 kg/cm², about 7.0 kg/cm² to about 8.5 kg/cm², or about 8.0 kg/cm² to about 8.5 kg/cm² to improve economic efficiency of the catalyst by ensuring optimum productivity. The polymerization pressure may be about 6.8 kg/cm² or more to prevent blocking due to excessive production of high molecular weight and to optimize productivity, and may be about 8.7 kg/cm² or less to prevent unit degradation of ethylene source under high pressure polymerization conditions.

Further, an organic solvent may be further used in the polymerization reaction as a reaction medium or a diluent. The organic solvent may be used in an amount such that a slurry phase polymerization may be appropriately performed considering the amount of olefinic monomers.

Specifically, the cocatalyst compound may include at least one of an aluminum-containing first cocatalyst of the following Chemical Formula 4, and a borate-based second cocatalyst of the following Chemical Formula 5.

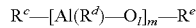    [Chemical Formula 4]

in Chemical Formula 4, $R^c$, $R^d$, and $R^e$ are the same as or different from each other, and are each independently hydrogen, a halogen, a C1 to C20 hydrocarbyl group, or a C1 to C20 hydrocarbyl group substituted with a halogen;

l is 0 or 1; and m is an integer of 2 or more;

    [Chemical Formula 5]

in Chemical Formula 5, $T^+$ is a polyatomic ion having a valence of +1, B is boron in +3 oxidation state, and G are each independently selected from the group consisting of hydride, dialkylamido, halide, alkoxide, aryloxide, hydrocarbyl, halocarbyl and halo-substituted hydrocarbyl, provided that G has 20 or less carbon.

The first cocatalyst of the Chemical Formula 4 may be an alkyaluminoxane-based compound including repeating units bonded in a linear, circular or network shape, and may be a trialkylaluminum compound. In addition, the alkyl group bonded to aluminum in the first cocatalyst compound may have 1 to 20 carbon atoms, or 1 to 10 carbon atoms. Specifically, the first cocatalyst may be an alkylaluminoxane-based compound selected from the group consisting of methyl aluminoxane (MAO), ethyl aluminoxane, isobutyl aluminoxane and butyl aluminoxane; or a trialkylaluminum compound selected from the group consisting of trimethylaluminum, triethylaluminum (TEAL), triisobutylaluminum, trihexylaluminum, trioctylaluminum and isoprenylaluminum.

And, the second cocatalyst of the Chemical Formula 5 may be a borate-based compound in the form of trisubstituted ammonium salts, dialkyl ammonium salts, or trisubstituted phosphonium salts. Specific examples of the second cocatalyst may include a borate-based compound in the form of tri-substituted ammonium salts selected from the group consisting of trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecycloctadecylammonium tetraphenylborate, N,N-dimethylanilinium tetraphenylborate, N,N-diethylanilinium tetraphenylborate, N, N-dimethyl(2,4,6-trimethylanilinium)tetraphenylborate, trimethylammonium tetrakis(pentafluorophenyl)borate, methylditetradecylammonium tetrakis(pentafluorophenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl) ammonium tetrakis(pentafluorophenyl)borate, tri(sec-butyl) ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis (pentafluorophenyl)borate, trimethylammonium tetrakis (2,3,4,6-tetrafluorophenyl)borate, triethylammonium tetrakis (2,3,4,6-tetrafluorophenyl)borate, tripropylammonium tetrakis (2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl) borate, N,N-diethylanilinium tetrakis(2,3,4,6-tetrafluorophenyl)borate and N,N-dimethyl-(2,4,6-trimethylanilinium) tetrakis-(2,3,4,6-tetrafluorophenyl)borate; a borate-based compound in the form of dialkyl ammonium salts selected from the group consisting of dioctadecyl ammonium tetrakis (pentafluorophenyl)borate, ditetradecylammonium tetrakis (pentafluorophenyl)borate and dicyclohexylammonium tetrakis(pentafluorophenyl)borate; or a borate-based compound in the form of tri-substituted phosphonium salts selected from the group consisting of triphenylphosphonium tetrakis(pentafluorophenyl)borate, methyldioctadecylphosphonium tetrakis(pentafluorophenyl)borate and tri(2,6-dimethylphenyl)phosphonium tetrakis(pentafluorophenyl)borate.

Meanwhile, the first and second metallocene compounds of the supported hybrid metallocene catalyst of the present disclosure have the above-described structural characteristics and can be stably supported on a support.

As the support, those containing hydroxyl groups or siloxane groups on the surface may be used. Specifically, supports containing hydroxyl groups or siloxane groups having high reactivity by removing moisture on the surface by drying at a high temperature may be used. More specifically, silica, alumina, magnesia, or the mixture thereof may be used, and the silica is more preferable. The support may be dried at high temperature, and may be silica, silica-alumina, or silica-magnesia dried at high temperature. The support may commonly contain oxide, carbonate, sulfate, and nitrate such as $Na_2O$, $K_2CO_3$, $BaSO_4$, $Mg(NO_3)_2$, and the like.

A drying temperature of the support may preferably be about 200° C. to 800° C., more preferably about 300° C. to 600° C., and most preferably about 300° C. to 400° C. When the drying temperature of the support is less than about 200° C., surface moisture may react with the cocatalyst due to excessive moisture. When it is greater than about 800° C., pores on the surface of the support may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the surface of the support may preferably be about 0.1 mmol/g to 10 mmol/g, more preferably about 0.5 mmol/g to 5 mmol/g. The amount of the hydroxyl groups on the surface of the support may be controlled by the preparation method and conditions of the support, or drying conditions, for example, temperature, time, vacuum, spray drying, or the like.

When the amount of the hydroxyl groups are less than about 0.1 mmol/g, the reaction sites with the cocatalyst may be little, and when it is greater than about 10 mmol/g, there is a possibility of being derived from moisture other than hydroxyl groups on the surface of the support particle, which is not preferable.

In addition, in the supported hybrid catalyst according to the embodiment of the present disclosure, a cocatalyst may be further supported on a support to activate the metallocene compound. The cocatalyst supported on the support is an organometallic compound containing a Group 13 metal, and is not particularly limited as long as it can be used in the polymerization of olefins in the presence of a general metallocene catalyst. Specific examples of the cocatalyst are as described above.

In the supported hybrid metallocene catalyst of the embodiment, a weight ratio of total transition metal included in the first and second metallocene compounds to the support may be 1:10 to 1:1000. When the support and the metallocene compounds are included within the above weight ratio, an optimal shape may be exhibited.

Further, a weight ratio of the cocatalyst compound used in the supported hybrid metallocene catalyst to the support may be 1:1 to 1:100. When the cocatalyst and the support are included within the above weight ratio, activity and fine structure of the polymer may be optimized.

Meanwhile, the supported hybrid metallocene catalyst may be prepared by using a method including the steps of: supporting a cocatalyst on a support; and supporting the first and the second metallocene compounds on the cocatalyst-supported support.

Herein, the first and the second metallocene compounds may be sequentially supported one by one, or two compounds may be supported together. At this time, there is no limitation on the order of supporting, but it is possible to improve the shape of the supported hybrid metallocene catalyst by supporting the second metallocene catalyst having a relatively poor morphology in advance. Therefore, the first metallocene catalyst may be supported after the second metallocene.

In the above method, the supporting conditions are not particularly limited and the supporting step may be carried out within a range well known to those skilled in the art. For example, the supporting step may be carried out at high temperature and at low temperature appropriately. For example, the supporting temperature may be in a range of about −30° C. to 150° C., preferably in a range of room temperature (about 25° C.) to about 100° C., more preferably in a range of room temperature to about 80° C. The supporting time may be appropriately controlled depending on the amount of the metallocene compounds to be supported. The reacted supported catalyst may be used without further treatment, after the reaction solvent is removed through filtration or distillation under reduced pressure, or subjected to Soxhlet filtering using aromatic hydrocarbon such as toluene, if necessary.

The preparation of the supported catalyst may be carried out in the presence of a solvent or without a solvent. When the solvent is used, it may include aliphatic hydrocarbon solvents such as hexane or pentane, aromatic hydrocarbon solvents such as toluene or benzene, chlorinated hydrocarbon solvents such as dichloromethane, ether solvents such as diethylether or tetrahydrofuran (THF), and common organic solvents such as acetone or ethylacetate. Preferred are hexane, heptane, toluene and dichloromethane.

Meanwhile, the supported hybrid metallocene catalyst of the embodiment can be used as it is in the polymerization of olefinic monomers. Also, the supported hybrid metallocene catalyst may be prepared as a pre-polymerized catalyst by contacting the catalyst with olefinic monomers. For example, it may be prepared as a pre-polymerized catalyst by contacting the catalyst with olefinic monomers such as ethylene, propylene, 1-butene, 1-hexene, 1-octene, and the like.

The olefinic monomer may be ethylene, alpha-olefin, cyclic olefin, diene olefin or triene olefin having two or more double bonds.

Specific examples of the olefinic monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopenta diene, 1,4-butadiene, 1,5-pentadiene, 1,6-hexadiene, styrene, alpha-methylstyrene, divinylbenzene, 3-chloromethylstyrene, and the like, and these monomers may be copolymerized by mixing two or more thereof.

In addition, the supported metallocene catalyst may be dissolved or diluted in a C5 to C12 aliphatic hydrocarbon solvent such as pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and injected into the reaction system. The solvent used herein is preferably used after removing a small amount of water or air, which acts as a catalyst poison, by treating with a small amount of alkyl aluminum.

In the method for preparing a polyolefin according to the present disclosure, the polymerization reaction may be performed by adding an additive such as a molecular weight regulator together with the supported metallocene catalyst in which at least one first metallocene compound represented by the Chemical Formula 1 and at least one second metallocene compound represented by the Chemical Formula 2 are supported on a support, and a cocatalyst.

The polyolefin obtained according to the method of the embodiment is characterized by a relatively narrow molecular weight distribution. In particular, the polyolefin may have a melt flow rate ratio (MFRR, $MI_{21.6}/MI_5$) of about 13 or less or about 8.0 to about 13, about 12.5 or less or about 8.2 to about 12.5, about 11.5 or less or about 8.5 to about 11.5, or about 10 or less or about 9.0 to about 10. In addition, the polyolefin may have a melt index ($MI_{5.0}$, condition E, 190° C., 5.0 kg load) of about 0.1 g/10 min to about 10 g/10 min, about 0.2 g/10 min to about 5 g/10 min, or about 0.3 g/10 min to about 1.5 g/10 min. For example, the melt index ($MI_{5.0}$) may be measured in accordance with ASTM D1238 (Condition E, 190° C., 5.0 kg load). Further, the melt flow rate ratio (MFRR, 21.6/5) may be calculated by dividing $MFR_{21.6}$ by $MFR_5$, and the $MFR_{21.6}$ may be measured in accordance with ISO 1133 at 190° C. under a load of 21.6 kg and the $MFR_5$ may be measured in accordance with ISO 1133 at 190° C. under a load of 5 kg.

The polyolefin may have a density of about 0.94 g/cm³ or more, or about 0.94 g/cm³ to about 0.96 g/cm³. This means that the polyolefin has a high content of crystal structure and is dense, and thus it is difficult to change the crystal structure during chlorination. For example, the density of the polyolefin may be measured in accordance with ASTM D-792.

The polyolefin has a relatively narrow molecular weight distribution, resulting in excellent uniformity in chlorine distribution in the polyolefin during chlorination. Therefore, elongation of the chlorinated polyolefin, compatibility with PVC and impact reinforcing performance can be significantly improved. Thus, it exhibits excellent chemical resistance, weather resistance, flame retardancy, processability and impact strength reinforcing effect, and can be suitably applied as an impact reinforcing agent for PVC pipes and window profiles.

In particular, the polyolefin is characterized by having a relatively narrow molecular weight distribution, and the molecular weight distribution (Mw/Mn) may be about 2.3 to about 5.0. Further, the weight average molecular weight of the polyolefin may be about 10000 g/mol to about 5000000 g/mol, about 10000 g/mol to about 1000000 g/mol, or about 50000 g/mol to about 200000 g/mol.

For example, the molecular weight distribution (MWD, polydispersity index) may be measured using gel permeation chromatography (GPC, manufactured by Water). The MWD may be determined by measuring a weight average molecular weight (Mw) and a number average molecular weight (Mn), and then dividing the weight average molecular weight by the number average molecular weight.

Specifically, PL-GPC220 manufactured by Waters may be used as the gel permeation chromatography (GPC) instrument, and a Polymer Laboratories PLgel MIX-B 300 mm length column may be used. An evaluation temperature may be 160° C., and 1,2,4-trichlorobenzene may be used for a solvent at a flow rate of 1 mL/min. Each polyethylene sample may be pretreated by dissolving in 1,2,4-trichlorobenzene containing 0.0125% of BHT for 10 hours using a GPC analyzer (PL-GP220), and the sample with a concentration of 10 mg/10 mL may be supplied in an amount of 200 microliters (μL). Mw and Mn may be obtained using a calibration curve formed using a polystyrene standard. 9 kinds of the polystyrene standard are used with the molecular weight (g/mol) of 2000/10000/30000/70000/200000/700000/2000000/4000000/10000000.

In addition, the polyolefin prepared by the polymerization reaction may be a homopolymer of an olefin that does not contain a separate copolymer, such as an ethylene homopolymer. For example, when the polyolefin is an ethylene homopolymer, preferably high density polyethylene (HDPE), the above-described physical properties may be more suitably satisfied. In particular, the high density polyethylene is excellent in softening point, firmness, strength and electrical insulation, and is used in various containers, packaging films, fibers, pipes, packings, insulating materials and the like.

II. Method for Preparing Chlorinated Polyolefin and Chlorinated Polyolefin

According to another embodiment of the present disclosure, there is provided a method for preparing a chlorinated polyolefin, including the step of chlorinating the polyolefin prepared by the method as described above with chlorine.

The method for preparing a chlorinated polyolefin of the present disclosure includes the steps of: polymerizing olefinic monomers in the presence of a supported metallocene catalyst in which at least one first metallocene compound represented by the following Chemical Formula 1 and at least one second metallocene compound represented by the following Chemical Formula 2 are supported on a support, and a cocatalyst while introducing the cocatalyst at 70 cc/hr to 140 cc/hr; and chlorinating the polyolefin with chlorine:

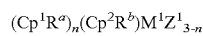
[Chemical Formula 1]

in Chemical Formula 1, $M^1$ is a Group 4 transition metal;

$Cp^1$ and $Cp^2$ are the same as or different from each other, and are each independently selected from the group consisting of indenyl and 4,5,6,7-tetrahydro-1-indenyl radical, which may be substituted with C1 to C20 hydrocarbon;

$R^a$ and $R^b$ are the same as or different from each other, and are each independently hydrogen, substituted or unsubstituted C1 to C20 alkyl, substituted or unsubstituted C1 to C10 alkoxy, substituted or unsubstituted C2 to C20 alkoxyalkyl, substituted or unsubstituted C6 to C20 aryl, substituted or unsubstituted C6 to C10 aryloxy, substituted or unsubstituted C2 to C20 alkenyl, substituted or unsubstituted C7 to C40 alkylaryl, substituted or unsubstituted C7 to C40 arylalkyl, substituted or unsubstituted C8 to C40 arylalkenyl, or substituted or unsubstituted C2 to C10 alkynyl;

$Z^1$ are each independently a halogen, substituted or unsubstituted C1 to C20 alkyl, substituted or unsubstituted C2 to C20 alkenyl, substituted or unsubstituted C7 to C40 alkylaryl, substituted or unsubstituted C7 to C40 arylalkyl, substituted or unsubstituted C6 to C20 aryl, substituted or unsubstituted C1 to C20 alkylidene, a substituted or unsubstituted amino group, substituted or unsubstituted C2 to C20 alkylalkoxy, or substituted or unsubstituted C7 to C40 arylalkoxy; and n is 1 or 0;

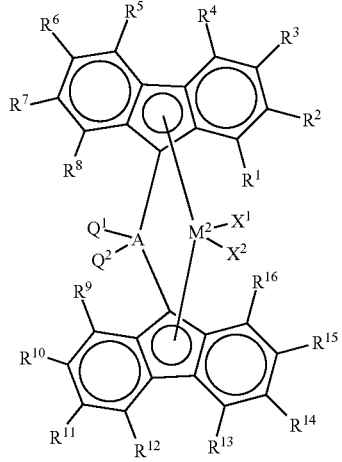
[Chemical Formula 2]

in Chemical Formula 2, $Q^1$ and $Q^2$ are the same as or different from each other, and are each independently substituted or unsubstituted C1 to C20 alkyl, substituted or unsubstituted C1 to C10 alkoxy, substituted or unsubstituted C2 to C20 alkoxyalkyl, or substituted or unsubstituted C6 to C20 aryl;

A is at least one or a combination of radicals containing carbon, germanium, or silicon atom;

$M^2$ is a Group 4 transition metal;

$X^1$ and $X^2$ are the same as or different from each other, and are each independently a halogen, substituted or unsubstituted C1 to C20 alkyl, substituted or unsubstituted C2 to C10 alkenyl, substituted or unsubstituted C7 to C40 alkylaryl, substituted or unsubstituted C7 to C40 arylalkyl, substituted or unsubstituted C6 to C20 aryl, substituted or unsubstituted C1 to C20 alkylidene, a substituted or unsubstituted amino group, substituted or unsubstituted C2 to C20 alkylalkoxy, or substituted or unsubstituted C7 to C40 arylalkoxy;

$R^1$ to $R^{16}$ are the same as or different from each other, and are each independently hydrogen, a halogen, substituted or unsubstituted C1 to C20 alkyl, substituted or unsubstituted C2 to C20 alkenyl, substituted or unsubstituted C1 to C20 alkylsilyl, substituted or unsubstituted C1 to C20 silylalkyl, substituted or unsubstituted C1 to C20 alkoxysilyl, substituted or unsubstituted C1 to C10 alkoxy, substituted or unsubstituted C2 to C20 alkoxyalkyl, substituted or unsubstituted C6 to C20 aryl, substituted or unsubstituted C6 to C10 aryloxy, substituted or unsubstituted C7 to C40 alkylaryl, substituted or unsubstituted C7 to C40 arylalkyl, substituted or unsubstituted C8 to C40 arylalkenyl, or substituted or unsubstituted C2 to C10 alkynyl, and two or more substituents adjacent to each other of $R^1$ to $R^{16}$ may be connected with each other to form a substituted or unsubstituted aliphatic or aromatic ring; and at least one of $R^1$ to $R^8$ is represented by the following Chemical Formula 3, and at least one of $R^9$ to $R^{16}$ is represented by the Chemical Formula 3, $$-L^1-D^1 \qquad \text{[Chemical Formula 3]}$$

in Chemical Formula 3, $L^1$ is C1 to C10 alkylene, and $D^1$ is C6 to C20 aryl, C4 to C20 cycloalkyl, or C2 to C20 alkoxyalkyl.

Specific reaction conditions of the step of polymerizing olefinic monomers to prepare the polyolefin, and specific examples of the supported hybrid catalyst including the first and second metallocene compounds, the support, the cocatalyst, and the like are as described above.

The chlorinated polyolefin may be prepared by chlorinating a polyolefin with chlorine.

The chlorinated polyolefin is generally prepared by an aqueous phase method in which a polyolefin is reacted with chlorine in a suspension state, or by an acid phase method in which polyethylene is reacted with chlorine in an aqueous HCl solution. When applying the aqueous phase method or the acid phase method, a chlorination time and a post-treatment time for neutralization, washing, and the like of the chlorinated polyolefin are greatly shortened. In addition, excellent uniformity in chlorine distribution in the chlorinated polyolefin may improve elasticity of the chlorinated polyolefin to be prepared. For example, the aqueous phase method is a method of chlorination using an emulsifier and a dispersant together with water, and the acid phase method is a method of chlorination of an acid aqueous solution such as an aqueous solution of hydrochloric acid (HCl) using an emulsifier and a dispersant.

More specifically, in the method for preparing a chlorinated polyethylene according to the present disclosure, the chlorination reaction may be performed by dispersing polyethylene with water, an emulsifier and a dispersant, and then adding a catalyst and chlorine to react.

For example, the emulsifier may be polyether or polyalkylene oxide.

For example, the dispersant may be a polymer salt or an organic acid polymer salt.

The organic acid may be, for example, methacrylic acid, acrylic acid, or the like.

The catalyst may be, for example, a catalyst for chlorination, a peroxide, or an organic peroxide.

The chlorine may be used alone or in combination with an inert gas.

A final chlorination temperature may be, for example, about 60° C. to about 150° C., about 70° C. to about 145° C., about 90° C. to about 140° C., or about 130° C. to about 137° C.

The chlorination reaction may be performed for, for example, about 10 minutes to about 10 hours, about 1 hour to about 6 hours, or about 2 hours to about 4 hours.

Meanwhile, the chlorination reaction may be performed by dispersing 100 parts by weight of the polyolefin, about 0.01 part by weight to 1.0 part by weight or about 0.05 part by weight to 0.5 part by weight of an emulsifier, and about 0.1 part by weight to 10 parts by weight or about 0.5 part by weight to 5.0 parts by weight of a dispersant in water, and then adding about 0.01 part by weight to 1.0 part by weight or about 0.05 part by weight to 0.5 part by weight of a catalyst and about 80 parts by weight to 200 parts by weight or about 100 parts by weight to 150 parts by weight of chlorine.

The chlorinated polyethylene prepared by the above reaction or chlorination process may be obtained as a powdered chlorinated polyethylene by further performing neutralization, washing and drying.

For example, the neutralization process may be a process of neutralizing the reactant that has undergone the chlorination process with a base solution at about 70° C. to about 90° C. or about 75° C. to about 80° C. for about 4 hours to 8 hours.

Since the polyolefin has a narrow molecular weight distribution, the chlorinated polyolefin obtained according to the method of the embodiment exhibits excellent uniformity in chlorine distribution, and has high elongation and excellent compatibility with PVC. In particular, the chlorinated polyolefin may have an elongation of 900% or more or 900% to 1500%, 950% or more or 950% to 1400%, or 1200% or more or 1200% to 1300%. Herein, the elongation (%) of the chlorinated polyolefin may be measured in accordance with ASTMD-2240.

For example, the chlorinated polyolefin may have a chlorine content of 20% by weight (wt %) to 45% by weight (wt %), 31 wt % to 40 wt %, or 33 wt % to 38 wt %. The chlorine content of the chlorinated polyolefin may be measured using combustion ion chromatography. For example, the combustion ion chromatography uses a combustion IC (ICS-5000/AQF-2100H) device equipped with an IonPac AS18 (4×250 mm) column. And the chlorine content may be measured using KOH (30.5 mM) as an eluent at a flow rate of 1 mL/min at an inlet temperature of 900° C. and an outlet temperature of 1000° C.

The chlorinated polyolefin may be, for example, a randomly chlorinated polyolefin, such as randomly chlorinated polyethylene.

The chlorinated polyolefin prepared according to the present disclosure is excellent in chemical resistance, weather resistance, flame retardancy, processability and impact strength reinforcing effect, and is widely used as an impact reinforcing agent for PVC pipes and window profiles.

III. PVC Composition

According to another embodiment of the present disclosure, there is provided a PVC composition including the chlorinated polyolefin prepared by the method as described above and polyvinyl chloride (PVC).

The PVC composition may include, for example, about 1 wt % to about 40 wt % of the chlorinated polyolefin prepared by the method as described above and about 60 wt % to about 99 wt % of polyvinyl chloride (PVC).

For example, the chlorinated polyolefin may be included in about 1 wt % to about 15 wt %, or about 5 wt % to about 10 wt %.

For example, the polyvinyl chloride may be included in about 85 wt % to about 99 wt %, or about 90 wt % to about 95 wt %.

In another example, the PVC composition of the present disclosure may include about 1 wt % to about 20 wt % of the chlorinated polyethylene, about 70 wt % to about 90 wt % of polyvinyl chloride (PVC), about 1 wt % to about 10 wt % of $TiO_2$, about 1 wt % to about 10 wt % of $CaCO_3$ and about 1 wt % to about 10 wt % of composite stearate (Ca, Zn-stearate).

The PVC composition may have a plasticization time of about 170 seconds or less, about 150 seconds or less, or about 150 seconds to 100 seconds. In addition, the PVC composition may have a Charpy impact strength measured at a low temperature of $-10°$ C. of about 10.9 $kJ/m^2$ or more or about 10.9 $kJ/m^2$ to 17 $kJ/m^2$, about 11.1 $kJ/m^2$ or more or about 11.1 $kJ/m^2$ to 16.5 $kJ/m^2$, or about 13.8 $kJ/m^2$ or more or about 13.8 $kJ/m^2$ to 16.1 $kJ/m^2$, when compounded with polyvinyl chloride (PVC) at 160° C. to 190° C. Within this range, a balance of physical properties and productivity are excellent. Herein, the Charpy impact strength ($-10°$ C., $kJ/m^2$) of the chlorinated polyolefin may be measured in accordance with ASTM D-256.

Advantageous Effects

According to the present disclosure, a polyolefin having a narrow molecular weight distribution can be prepared very effectively by introducing a cocatalyst in an optimum content in the presence of a supported hybrid metallocene catalyst containing two or more metallocene compounds having a specific chemical structure. The polyolefin prepared according to the present disclosure exhibits excellent uniformity in chlorine distribution in polyolefin during chlorination, thereby significantly improving elongation of the chlorinated polyolefin, compatibility with PVC and impact reinforcing performance. Thus, it exhibits excellent chemical resistance, weather resistance, flame retardancy, processability and impact strength reinforcing effect, and can be suitably applied as an impact reinforcing agent for PVC pipes and window profiles.

DETAILED DESCRIPTION OF THE EMBODIMENTS

The present invention will be described in more detail with reference to the following examples. However, these examples are for illustrative purposes only, and the invention is not intended to be limited by these examples.

EXAMPLES

Synthesis Examples of Metallocene Compound

Synthesis Example 1: First Metallocene Compound [$^t$Bu-O—$(CH_2)_6$—$C_9H_6$]$_2$ZrCl$_2$ t-Butyl-O—$(CH_2)_6$—Cl was prepared by the method shown in Tetrahedron Lett. 2951 (1988) using 6-chlorohexanol, and reacted with indene to obtain t-Butyl-O—$(CH_2)_6$—$C_9H_7$ (yield 90%). Further, t-Butyl-O—$(CH_2)_6$—$C_9H_7$ was dissolved in THF at $-78°$ C., and normal butyllithium (n-BuLi) was slowly added thereto. Thereafter, it was heated to room temperature and reacted for 8 hours. The lithium salt solution synthesized as described above was slowly added to a suspension solution of $ZrCl_4(THF)_2$ (1.70 g, 4.50 mmol)/THF (30 mL) at $-78°$ C., and further reacted for about 6 hours at room temperature. All volatiles were dried in vacuum and the resulting oily liquid material was filtered by adding a hexane solvent. The filtered solution was dried in vacuum, and hexane was added to obtain a precipitate at a low temperature ($-20°$ C.). The obtained precipitate was filtered at a low temperature to obtain bis(3-(6-(tert-butoxy)hexyl)-1H-inden-1-yl)zirconium(IV) chloride ([$^t$Bu-O—$(CH_2)_6$—$C_9H_6$]$_2$ZrCl$_2$) in the form of a white solid (yield 88%).

$^1$H NMR (300 MHz, CDCl$_3$): 0.84-1.63 (38H, m), 2.61-2.76 (1H, m), 2.87-2.97 (1H, m), 3.24-3.33 (4H, m), 5.66 (0.5H, d), 5.80 (0.5H, d), 6.04 (0.5H, d), 6.28 (0.5H, d), 7.18-7.63 (8H, m).

Synthesis Example 2: First Metallocene Compound [$^t$Bu-O—$(CH_2)_6$—$C_5H_4$]$_2$ZrCl$_2$ t-Butyl-O—$(CH_2)_6$—Cl was prepared by the method shown in Tetrahedron Lett. 2951 (1988) using 6-chlorohexanol, and reacted with NaCp to obtain t-Butyl-O—$(CH_2)_6$—$C_5H_5$ (yield 60%, b.p. 80° C./0.1 mmHg).

Further, t-Butyl-O—$(CH_2)_6$—$C_5H_5$ was dissolved in THF at $-78°$ C., and normal butyllithium (n-BuLi) was slowly added thereto. Thereafter, it was heated to room temperature and reacted for 8 hours. The lithium salt solution synthesized as described above was slowly added to a suspension solution of $ZrCl_4(THF)_2$ (1.70 g, 4.50 mmol)/THF (30 mL) at $-78°$ C., and further reacted for about 6 hours at room temperature.

All volatiles were dried in vacuum and the resulting oily liquid material was filtered by adding a hexane solvent. The filtered solution was dried in vacuum, and hexane was added to obtain a precipitate at a low temperature ($-20°$ C.). The obtained precipitate was filtered at a low temperature to obtain [$^t$Bu-O—$(CH_2)_6$—$C_5H_4$]$_2$ZrCl$_2$ in the form of a white solid (yield 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR (CDCl$_3$): 135.09, 116.66, 112.28, 72.42, 61.52, 30.66, 30.61, 30.14, 29.18, 27.58, 26.00.

Synthesis Example 3: Second Metallocene Compound ($^t$Bu-O—$(CH_2)_6$)MeSi(2-$(C_5H_9CH_2)$9-$C_{13}H_7$)$_2$ZrCl$_2$ 1.0 mole of tert-Bu-O—$(CH_2)_6$MgCl solution (Grignard reagent) was obtained from the reaction between tert-Bu-O—$(CH_2)_6$Cl and Mg(0) in THF solvent. The Grignard compound prepared above was added to a flask containing MeSiCl$_3$ (176.1 mL, 1.5 mol) and THF (2.0 mL) at about $-30°$ C., stirred at room temperature for about 8 hours or more, and the filtered solution was vacuum-dried to obtain tert-Bu-O—$(CH_2)_6$SiMeCl$_2$ (yield 92%).

2-(cyclopentylmethyl)-9H-fluorene (3.33 g, 20 mmol) was dissolved in about 50 mL of diethyl ether in a dry ice/acetone bath at about $-20°$ C., and 4.4 mL (11 mmol) of n-BuLi (2.5 M in hexane) was slowly added and stirred at room temperature for about 6 hours to prepare 2-(cyclopentylmethyl)-9H-fluorenyl lithium solution. After stirring was completed, the reactor temperature was cooled to −30° C. and the 2-(cyclopentylmethyl)-9H-fluorenyl lithium solution prepared above was slowly added to tert-Bu-O—($CH_2$)$_6$SiMeCl$_2$ (1.49 g, 5.5 mmol) solution dissolved in hexane (100 mL) at about −30° C. over about 1 hour. After stirring at room temperature for about 8 hours or more, water was added for extraction, followed by evaporation to obtain (6-(tert-butoxy)hexyl)bis(2-(cyclopentylmethyl)-9H-fluoren-9-yl)(methyl)silane (3.06 g, yield 88.1%). A structure of the ligand was confirmed by 1H-NMR.

$^1$H NMR (500 MHz, CDCl$_3$): −0.32 (3H, d), 0.25-1.73 (35H, m), 2.09-2.14 (2H, dd), 2.64-2.71 (4H, m), 3.21-3.24 (2H, m), 4.04 (1H, d), 4.10 (1H, d), 7.16-7.84 (14H, m).

(6-(tert-butoxy)hexyl)bis(2-(cyclopentylmethyl)-9H-fluoren-9-yl)(methyl)silane (3.06 g, 4.4 mmol) was dissolved in about 50 mL of toluene at about −20° C., and 2.1 mL of MTBE (methyl tert-butyl ether) was added thereto. Thereafter, 3.9 mL of n-BuLi (2.5 M in hexane) was slowly added thereto and reacted for about 8 hours or more, while raising the temperature to room temperature. Then, the dilithium salt slurry solution prepared above was slowly added to a slurry solution of ZrCl$_4$(THF)$_2$ (1.66 g, 4.4 mmol)/toluene (100 mL) at about −20° C., and further reacted at room temperature for about 8 hours. The precipitate was filtered and washed several times with hexane to obtain dichloro[[[6-(tert-butoxy)hexyl]methylsilylene]bis[(4a,4b,8a,9,9a-η)-2-(cyclopentylmethyl)-9H-fluoren-9-ylidene]] zirconium(($^t$Bu-O—($CH_2$)$_6$)MeSi(2-(C$_5$H$_9$CH$_2$)9-C$_{13}$H$_7$)$_2$ZrCl$_2$) in the form of a solid (1.25 g, yield 33.2%).

$^1$H NMR (500 MHz, CDCl$_3$): 1.21-1.27 (12H, m), 1.59-1.89 (22H, m), 2.10-2.24 (6H, m), 2.49-2.72 (4H, m), 3.46 (2H, t), 7.02-1.41 (14H, m).

Synthesis Example 4: Second Metallocene Compound ($^t$Bu-O—($CH_2$)$_6$)($CH_3$)Si($C_5$($CH_3$)$_4$)($^t$Bu-N)TiCl$_2$ 50 g of Mg (s) was added to a 10 L reactor at room temperature, followed by 300 mL of THF. 0.5 g of 12 was added, and the reactor temperature was maintained at 50° C. After the reactor temperature was stabilized, 250 g of 6-t-butoxyhexyl chloride was added to the reactor at a rate of 5 mL/min using a feeding pump. As the 6-t-butoxyhexyl chloride was added, it was observed that the temperature of the reactor was elevated by about 4° C. to 5° C. C. It was stirred for 12 hours while continuously adding 6-t-butoxyhexyl chloride. After the reaction for 12 hours, a black reaction solution was produced. 2 mL of the black solution was taken to which water was added to obtain an organic layer. The organic layer was confirmed to be 6-t-butoxyhexane through $^1$H-NMR. It could be seen from the above 6-t-butoxyhexane that Grignard reaction was well performed. Consequently, 6-t-butoxyhexyl magnesium chloride was synthesized.

500 g of MeSiCl$_3$ and 1 L of THF were introduced to a reactor, and then the reactor temperature was cooled down to −20° C. 560 g of the 6-t-butoxyhexyl magnesium chloride synthesized above was added to the reactor at a rate of 5 mL/min using a feeding pump. After completion of the feeding of Grignard reagent, the mixture was stirred for 12 hours while slowly raising the reactor temperature to room temperature. After the reaction for 12 hours, it was confirmed that white MgCl$_2$ salt was produced. 4 L of hexane was added thereto and the salt was removed through a labdori to obtain a filtered solution. After the filtered solution was added to the reactor, hexane was removed at 70° C. to obtain a pale yellow liquid. The obtained liquid was confirmed to be the desired compound, methyl(6-t-butoxy hexyl)dichlorosilane, through 1H-NMR.

$^1$H-NMR (CDCl$_3$): 3.3 (t, 2H), 1.5 (m, 3H), 1.3 (m, 5H), 1.2 (s, 9H), 1.1 (m, 2H), 0.7 (s, 3H).

1.2 mol of tetramethylcyclopentadiene (150 g) and 2.4 L of THF were added to the reactor, and then the reactor temperature was cooled down to −20° C. 480 mL of n-BuLi was added to the reactor at a rate of 5 ml/min using a feeding pump. After n-BuLi was added, the mixture was stirred for 12 hours while slowly raising the reactor temperature to room temperature. After the reaction for 12 hours, an equivalent of methyl(6-t-butoxyhexyl)dichlorosilane (326 g, 350 mL) was rapidly added to the reactor. The mixture was stirred for 12 hours while slowly raising the reactor temperature to room temperature. Then, the reactor temperature was cooled to 0° C. again, and 2 equivalents of t-BuNH$_2$ was added. The mixture was stirred for 12 hours while slowly raising the reactor temperature to room temperature. After the reaction for 12 hours, THF was removed. Thereafter, 4 L of hexane was added and the salt was removed through a labdori to obtain a filtered solution. The filtered solution was added to the reactor again, and hexane was removed at 70° C. to obtain a yellow solution. The yellow solution obtained above was confirmed to be methyl(6-t-butoxyhexyl)(tetramethylcyclopentadienyl)t-butylaminosilane through $^1$H-NMR.

TiCl$_3$(THF)$_3$ (10 mmol) was rapidly added to a dilithium salt of a ligand at −78° C., which was synthesized from n-BuLi and the ligand of dimethyl(tetramethylcyclopentadienyl)t-butylaminosilane in THF solution. While slowly heating the reaction solution from −78° C. to room temperature, it was stirred for 12 hours. After stirring for 12 hours, an equivalent of PbCl$_2$ (10 mmol) was added to the reaction solution at room temperature, and then stirred for 12 hours. After stirring for 12 hours, a dark black solution having a blue color was obtained. THF was removed from the reaction solution thus obtained before hexane was added and the product was filtered. Hexane was removed from the filtered solution, and then the product was confirmed to be the desired ($^t$Bu-O—($CH_2$)$_6$)($CH_3$)Si($C_5$($CH_3$)$_4$)($^t$Bu-N)TiCl$_2$, which is ([methyl(6-t-butoxyhexyl)silyl(η5-tetramethylcyclopentadienyl)(t-Butylamido)]TiCl$_2$) through 1H-NMR.

$^1$H-NMR (CDCl$_3$): 3.3 (s, 4H), 2.2 (s, 6H), 2.1 (s, 6H), 1.8-0.8 (m), 1.4 (s, 9H), 1.2 (s, 9H), 0.7 (s, 3H).

Synthesis Example 5: Second Metallocene Compound ($^t$Bu-O—($CH_2$)$_6$)MeSi(9-C$_{13}$H$_9$)$_2$ZrCl$_2$ 1.0 mole of tert-Bu-O—($CH_2$)$_6$MgCl solution (Grignard reagent) was obtained from the reaction between tert-Bu-O—($CH_2$)$_6$Cl and Mg(0) in THF solvent. The Grignard compound prepared above was added to a flask containing MeSiCl$_3$ (176.1 mL, 1.5 mol) and THF (2.0 mL) at −30° C., stirred at room temperature for about 8 hours or more, and the filtered solution was vacuum-dried to obtain tert-Bu-O—($CH_2$)$_6$SiMeCl$_2$ (yield 92%).

Fluorene (3.33 g, 20 mmol), hexane (100 mL) and MTBE (methyl tert-butyl ether, 1.2 mL, 10 mmol) were added to the reactor at −20° C., and 8 mL of n-BuLi (2.5M in hexane) was slowly added thereto, followed by stirring at room temperature for 6 hours. After stirring was completed, the reactor temperature was cooled to −30° C., and the fluorenyl lithium solution prepared above was slowly added to tert-Bu-O—($CH_2$)$_6$SiMeCl$_2$ (2.7 g, 10 mmol) solution dissolved in hexane (100 mL) at about −30° C. over 1 hour. After stirring at room temperature for 8 hours or more, water was added for extraction, followed by evaporation to obtain (tert-Bu-O—(CH$_2$)$_6$)MeSi(9-C$_{13}$H$_{10}$)$_2$ (5.3 g, yield 100%). A structure of the ligand was confirmed by 1H-NMR.

$^1$H NMR (500 MHz, CDCl$_3$): −0.35 (3H, s), 0.26 (2H, m), 0.58 (2H, m), 0.95 (4H, m), 1.17 (9H, s), 1.29 (2H, m), 3.21 (2H, t), 4.10 (2H, s), 7.25 (4H, m), 7.35 (4H, m), 7.40 (4H, m), 7.85 (4H, d).

4.8 mL of n-BuLi (2.5 M in hexane) was slowly added to (tert-Bu-O—(CH$_2$)$_6$)MeSi(9-C$_{13}$H$_{10}$)$_2$ (3.18 g, 6 mmol)/MTBE (20 mL) solution at −20° C. and reacted for 8 hours or more, while raising the temperature to room temperature. Then, the dilithium salt slurry solution prepared above was slowly added to a slurry solution of ZrCl$_4$(THF)$_2$ (2.26 g, 6 mmol)/hexane (20 mL) at about −20° C., and further reacted at room temperature for 8 hours. The precipitate was filtered and washed several times with hexane to obtain (tert-Bu-O—(CH$_2$)$_6$)MeSi(9-C$_{13}$H$_9$)$_2$ZrCl$_2$ in the form of a red solid (4.3 g, yield 94.5%).

$^1$H NMR (500 MHz, C$_6$D$_6$): 1.15 (9H, s), 1.26 (3H, s), 1.58 (2H, m), 1.66 (4H, m), 1.91 (4H, m), 3.32 (2H, t), 6.86 (2H, t), 6.90 (2H, t), 7.15 (4H, m), 7.60 (4H, dd), 7.64 (2H, d), 7.77 (2H, d).

Preparation Examples of Supported Hybrid Metallocene Catalyst

Preparation Example 1: Supported Hybrid Metallocene Catalyst (1) Preparation of Support Silica (SP 952, manufactured by Grace Davison Co.) was dehydrated and dried at a temperature of 600° C. for 12 hours under vacuum.

(2) Preparation of Supported Hybrid Metallocene Catalyst 10 g of the dried silica was introduced to a glass reactor, and 100 mL of toluene was additionally added and stirred. After sufficient dispersion of the silica, 60.6 mL of 10 wt % methylaluminoxane (MAO)/toluene solution was added thereto. Thereafter, the temperature was raised to 80° C. and the mixture was slowly reacted while stirring at 200 rpm for 16 hours. After lowering the temperature to 40° C. again, the reaction solution was washed with a sufficient amount of toluene to remove unreacted aluminum compounds, and the remaining toluene was removed under reduced pressure. 100 mL of toluene was added thereto again, to which 0.25 mmol of the first metallocene catalyst of Synthesis Example 1 dissolved in toluene was added together and reacted for 1 hour. After completion of the reaction, 0.25 mmol of the second metallocene catalyst of Synthesis Example 3 dissolved in toluene was added and further reacted for 2 hours while stirring. After completion of the reaction, stirring was stopped and the toluene layer was separated and removed. Then, the remaining toluene was removed under reduced pressure at 40° C. to prepare a supported hybrid catalyst.

Preparation Example 2: Supported Hybrid Metallocene Catalyst (1) Preparation of Support Silica (SP 952, manufactured by Grace Davison Co.) was dehydrated and dried at a temperature of 600° C. for 12 hours under vacuum.

(2) Preparation of Supported Hybrid Metallocene Catalyst 10 g of the dried silica was introduced to a glass reactor, and 100 mL of toluene was additionally added and stirred. After sufficient dispersion of the silica, 60.6 mL of 10 wt % methylaluminoxane (MAO)/toluene solution was added thereto. Thereafter, the temperature was raised to 80° C. and the mixture was slowly reacted while stirring at 200 rpm for 16 hours. After lowering the temperature to 40° C. again, the reaction solution was washed with a sufficient amount of toluene to remove unreacted aluminum compounds, and the remaining toluene was removed under reduced pressure. 100 mL of toluene was added thereto again, to which 0.25 mmol of the first metallocene catalyst of Synthesis Example 2 dissolved in toluene was added together and reacted for 1 hour. After completion of the reaction, 0.25 mmol of the second metallocene catalyst of Synthesis Example 4 dissolved in toluene was added and further reacted for 2 hours while stirring. After completion of the reaction, stirring was stopped and the toluene layer was separated and removed. Then, the remaining toluene was removed under reduced pressure at 40° C. to prepare a supported hybrid catalyst.

Preparation Example 3: Supported Hybrid Metallocene Catalyst (1) Preparation of Support Silica (SP 952, manufactured by Grace Davison Co.) was dehydrated and dried at a temperature of 600° C. for 12 hours under vacuum.

(2) Preparation of Supported Hybrid Metallocene Catalyst 10 g of the dried silica was introduced to a glass reactor, and 100 mL of toluene was additionally added and stirred. After sufficient dispersion of the silica, 60.6 mL of 10 wt % methylaluminoxane (MAO)/toluene solution was added thereto. Thereafter, the temperature was raised to 80° C. and the mixture was slowly reacted while stirring at 200 rpm for 16 hours. After lowering the temperature to 40° C. again, the reaction solution was washed with a sufficient amount of toluene to remove unreacted aluminum compounds, and the remaining toluene was removed under reduced pressure. 100 mL of toluene was added thereto again, to which 0.25 mmol of the first metallocene catalyst of Synthesis Example 2 dissolved in toluene was added together and reacted for 1 hour. After completion of the reaction, 0.25 mmol of the second metallocene catalyst of Synthesis Example 3 dissolved in toluene was added and further reacted for 2 hours while stirring. After completion of the reaction, stirring was stopped and the toluene layer was separated and removed. Then, the remaining toluene was removed under reduced pressure at 40° C. to prepare a supported hybrid catalyst.

Preparation Example 4: Supported Hybrid Metallocene Catalyst (1) Preparation of Support Silica (SP 952, manufactured by Grace Davison Co.) was dehydrated and dried at a temperature of 600° C. for 12 hours under vacuum.

(2) Preparation of Supported Hybrid Metallocene Catalyst 10 g of the dried silica was introduced to a glass reactor, and 100 mL of toluene was additionally added and stirred. After sufficient dispersion of the silica, 60.6 mL of 10 wt % methylaluminoxane (MAO)/toluene solution was added thereto. Thereafter, the temperature was raised to 80° C. and the mixture was slowly reacted while stirring at 200 rpm for 16 hours. After lowering the temperature to 40° C. again, the reaction solution was washed with a sufficient amount of toluene to remove unreacted aluminum compounds, and the remaining toluene was removed under reduced pressure. 100 mL of toluene was added thereto again, to which 0.25 mmol of the first metallocene catalyst of Synthesis Example 1 dissolved in toluene was added together and reacted for 1 hour. After completion of the reaction, 0.25 mmol of the second metallocene catalyst of Synthesis Example 5 dissolved in toluene was added and further reacted for 2 hours while stirring. After completion of the reaction, stirring was stopped and the toluene layer was separated and removed. Then, the remaining toluene was removed under reduced pressure at 40° C. to prepare a supported hybrid catalyst.

Examples of Polymerization of Olefinic Monomers

Example 1: Preparation of Polyolefin

Under the conditions as shown in Table 1 below, an ethylene homopolymerization reaction was performed using the supported hybrid metallocene catalyst of Preparation Example 1 (precursors of Synthesis Examples 1 and 3).
23 kg/hr of hexane, 7 kg/hr of ethylene, 2.0 g/hr of hydrogen and 130 cc/hr of triethylaluminum (TEAL) were introduced to a 0.2 m$^3$ single-CSTR reactor, and then the supported hybrid metallocene catalyst according to Preparation Example 1 was injected thereto at 2 g/hr (170 μmol/hr). At this time, the reactor was maintained at a temperature of 82° C. and a pressure of 7.0 kg/cm$^2$ to 7.5 kg/cm$^2$, and the polymerization was carried out for about 4 hours. Thereafter, the polymerization product was made into final polyethylene through a solvent removal plant and a dryer.
The polyethylene prepared was mixed with 1000 ppm of calcium stearate (manufactured by Doobon INC.) and 2000 ppm of heat stabilizer 21B (manufactured by Songwon Industrial Co. Ltd.), and then made into pellets.

Example 2: Preparation of Polyolefin

Polyethylene was prepared in the same manner as in Example 1, except that the reactor pressure was adjusted to 8.0 kg/cm$^2$ to 8.5 kg/cm$^2$ as shown in Table 1.

Examples 3 and 4: Preparation of Polyolefin

Polyethylene was prepared in the same manner as in Example 1, except that triethylaluminum (TEAL) was adjusted at a flow rate of 110 cc/hr and 90 cc/hr, respectively, as shown in Table 1.

Comparative Example 1: Preparation of Polyolefin

Polyethylene was prepared in the same manner as in Example 1, except that the polymerization process was performed using the supported hybrid metallocene catalyst according to Preparation Example 2 (precursors of Synthesis Examples 2 and 4) as shown in Table 1.

Comparative Example 2: Preparation of Polyolefin

Polyethylene was prepared in the same manner as in Comparative Example 2, except that triethylaluminum (TEAL) was adjusted at a flow rate of 150 cc/hr as shown in Table 1.

Comparative Example 3: Preparation of Polyolefin

Polyethylene was prepared in the same manner as in Example 1, except that the polymerization process was performed using the supported hybrid metallocene catalyst according to Preparation Example 3 (precursors of Synthesis Examples 2 and 3) as shown in Table 1.

Comparative Example 4: Preparation of Polyolefin

Polyethylene was prepared in the same manner as in Example 1, except that the polymerization process was performed using the supported hybrid metallocene catalyst according to Preparation Example 4 (precursors of Synthesis Examples 1 and 5) as shown in Table 1.

Comparative Example 5: Preparation of Polyolefin

Polyethylene was prepared in the same manner as in Example 1, except that triethylaluminum (TEAL) was adjusted at a flow rate of 170 cc/hr as shown in Table 1.

Comparative Example 6: Preparation of Polyolefin

A polyethylene polymerization process was performed in the same manner as in Example 1, except that triethylaluminum (TEAL) was adjusted at a flow rate of 60 cc/hr as shown in Table 1. However, the process of the Comparative Example 6 was unstable, and thus, normal polymerization was not performed and polyethylene could not be prepared.
The polymerization conditions applied in Examples 1 to 4 and Comparative Examples 1 to 6 are shown in Table 1 below.

TABLE 1

| | Catalyst composition | | Polymerization process | | | | | |
|---|---|---|---|---|---|---|---|---|
| | First precursor | Second precursor | Temperature (° C.) | Pressure (kg/cm$^2$) | Catalyst (g/h) | C2 (kg/h) | H2 (g/h) | TEAL (cc/h) |
| Example 1 | Syn. Ex. 1 | Syn. Ex. 3 | 80 | 7.0-7.5 | 2 | 7 | 2.0 | 130 |
| Example 2 | Syn. Ex. 1 | Syn. Ex. 3 | 80 | 8.0-8.5 | 2 | 7 | 2.0 | 130 |
| Example 3 | Syn. Ex. 1 | Syn. Ex. 3 | 80 | 7.0-7.5 | 2 | 7 | 2.0 | 110 |
| Example 4 | Syn. Ex. 1 | Syn. Ex. 3 | 80 | 7.0-7.5 | 2 | 7 | 2.0 | 90 |
| Comparative Example 1 | Syn. Ex. 2 | Syn. Ex. 4 | 80 | 7.0-7.5 | 2 | 7 | 2.0 | 130 |
| Comparative Example 2 | Syn. Ex. 2 | Syn. Ex. 4 | 80 | 7.0-7.5 | 2 | 7 | 2.0 | 150 |

TABLE 1-continued

| | Catalyst composition | | Polymerization process | | | | | |
|---|---|---|---|---|---|---|---|---|
| | First precursor | Second precursor | Temperature (° C.) | Pressure (kg/cm²) | Catalyst (g/h) | C2 (kg/h) | H2 (g/h) | TEAL (cc/h) |
| Comparative Example 3 | Syn. Ex. 2 | Syn. Ex. 3 | 80 | 7.0-7.5 | 2 | 7 | 2.0 | 130 |
| Comparative Example 4 | Syn. Ex. 1 | Syn. Ex. 5 | 80 | 7.0-7.5 | 2.4 | 7 | 2.0 | 130 |
| Comparative Example 5 | Syn. Ex. 1 | Syn. Ex. 3 | 80 | 7.0-7.5 | 2.2 | 7 | 2.0 | 170 |
| Comparative Example 6 | Syn. Ex. 1 | Syn. Ex. 3 | 80 | 6.5-8.5 | 2 | 7 | 2.0 | 60 |

<Evaluation of Physical Properties of Polyolefin, Chlorinated Polyolefin, and PVC Composition>

The physical properties of the polyethylene prepared by the polymerization process of Examples 1 to 4 and Comparative Examples 1 to 5, the chlorinated polyethylene prepared using the same, and the PVC composition including the same are shown in Table 2 below.

First, the polyethylene prepared by the polymerization process of Examples 1 to 4 and Comparative Examples 1 to 5 was chlorinated to prepare chlorinated polyethylene (CPE). In addition, a PVC composition was prepared by compounding the chlorinated polyethylene thus prepared and polyvinyl chloride (PVC).

Preparation of Chlorinated Polyethylene 5,000 L of water and 550 kg of high density polyethylene were added to a reactor, followed by sodium polymethacrylate as a dispersant, oxypropylene and oxyethylene copolyether as an emulsifier, and benzoyl peroxide as a catalyst. Then, chlorination was carried out by injecting gaseous chlorine at a final temperature of 132° C. for 3 hours. The chlorinated reactant was neutralized with NaOH or $Na_2CO_3$ for 4 hours, washed again with running water for 4 hours, and finally dried at 120° C. to prepare chlorinated polyethylene in powder form.

Preparation of PVC Compound

A PVC compound specimen was prepared by compounding 6.5 wt % of the chlorinated polyethylene, 81.6 wt % of polyvinyl chloride (PVC), 3.2 wt % of $TiO_2$, 4.1 wt % of $CaCO_3$, and 4.5 wt % of composite stearate (Ca, Zn).

Evaluation of Physical Properties (1) $MI_{5.0}$ and MFRR (21.6/5): Melt Index ($MI_{5.0}$) of polyethylene was measured in accordance with ASTM D1238 (Condition E, 190° C., 5.0 kg load). In addition, the melt flow rate ratio (MFRR, 21.6/5) was calculated by dividing $MFR_{21.6}$ by $MFR_5$, and the $MFR_{21.6}$ was measured in accordance with ISO 1133 at 190° C. under a load of 21.6 kg and the $MFR_5$ was measured in accordance with ISO 1133 at 190° C. under a load of 5 kg.

(2) Density (g/cm³): Density (g/cm³) was measured in accordance with ASTM D-792.

(3) Elongation of CPE (%): Elongation (%) of chlorinated polyethylene was measured in accordance with ASTM D-2240.

(4) Charpy impact strength (−10° C., kJ/m²) of PVC compound: Charpy impact strength (−10° C., kJ/m²) was measured in accordance with ASTM D-256.

TABLE 2

| | Polyethylene | | | | CPE | PVC compound Charpy impact strength |
|---|---|---|---|---|---|---|
| | $MI_{5.0}$ (g/10 min) | MFRR (21.6/5) | Density (g/cm³) | | Elongation (%) | (−10° C., kJ/m²) |
| Example 1 | 1.1 | 12.8 | 0.953 | | 900 | 10.9 |
| Example 2 | 1.0 | 12.4 | 0.953 | | 950 | 11.1 |
| Example 3 | 1.0 | 9.9 | 0.951 | | 1300 | 13.8 |
| Example 4 | 1.1 | 9.2 | 0.950 | | 1200 | 16.1 |
| Comparative Example 1 | 1.1 | 14.5 | 0.951 | | 820 | 10.6 |
| Comparative Example 2 | 1.0 | 14.3 | 0.952 | | 800 | 10.5 |
| Comparative Example 3 | 1.0 | 14.3 | 0.953 | | 790 | 10.5 |
| Comparative Example 4 | 0.9 | 14.1 | 0.952 | | 850 | 10.7 |
| Comparative Example 5 | 1.0 | 13.8 | 0.953 | | 860 | 10.8 |

As shown in Table 2, it was confirmed from Examples 1 to 4 that high density polyethylene had a narrow molecular weight distribution, thereby achieving high elongation after chlorination. Thus, impact strength of the PVC compound was excellent. In particular, Examples 3 and 4 exhibited a melt flow rate ratio (MFRR) of 10 or less, while having not only a narrow molecular weight distribution, but also excellent elongation characteristics of 1200% or more by reducing the input amount of TEAL in the polymerization process. Thus, it can be seen that impact strength was improved to 13.8 kJ/m² and 16 kJ/m², respectively.

On the other hand, Comparative Examples 1 to 5 had a problem that the elongation of the chlorinated polyethylene was lowered and the impact strength of the PVC compound was reduced due to a broad molecular weight distribution of the high density polyethylene. Specifically, Comparative Examples 1 to 5 had a melt flow rate ratio (MFRR) of 13.8 to 14.5, and showed the elongation and impact strength inferior to Examples due to the broad molecular weight distribution. In particular, Comparative Example 2 was found to have no effect of lowering the molecular weight distribution in spite of the input control of TEAL in the process, and the impact strength of the final PVC compound was rather reduced.

The invention claimed is:

1. A method for preparing a polyolefin, comprising the step of polymerizing olefinic monomers in the presence of a supported metallocene catalyst in which at least one first metallocene compound represented by the following Chemical Formula 1, at least one second metallocene compound represented by the following Chemical Formula 2, and a cocatalyst are supported on a support, and a trialkylaluminum, $$(Cp^1R^a)_n(Cp^2R^b)M^1Z^1_{3-n}$$ [Chemical Formula 1]

in Chemical Formula 1, $M^1$ is a Group 4 transition metal;

$Cp^1$ and $Cp^2$ are the same as or different from each other, and are each independently selected from the group consisting of indenyl and 4,5,6,7-tetrahydro-1-indenyl radical, each of which is optionally substituted with C1 to C20 hydrocarbon;

$R^a$ and $R^b$ are the same as or different from each other, and are each independently hydrogen, substituted or unsubstituted C1 to C20 alkyl, substituted or unsubstituted C1 to C10 alkoxy, substituted or unsubstituted C2 to C20 alkoxyalkyl, substituted or unsubstituted C6 to C20 aryl, substituted or unsubstituted C6 to C10 aryloxy, substituted or unsubstituted C2 to C20 alkenyl, substituted or unsubstituted C7 to C40 alkylaryl, substituted or unsubstituted C7 to C40 arylalkyl, substituted or unsubstituted C8 to C40 arylalkenyl, or substituted or unsubstituted C2 to C10 alkynyl;

$Z^1$ is each independently a halogen, substituted or unsubstituted C1 to C20 alkyl, substituted or unsubstituted C2 to C20 alkenyl, substituted or unsubstituted C7 to C40 alkylaryl, substituted or unsubstituted C7 to C40 arylalkyl, substituted or unsubstituted C6 to C20 aryl, substituted or unsubstituted C1 to C20 alkylidene, a substituted or unsubstituted amino group, substituted or unsubstituted C2 to C20 alkylalkoxy, or substituted or unsubstituted C7 to C40 arylalkoxy; and n is 1 or 0;

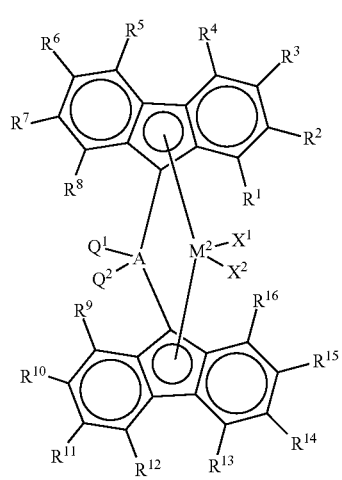

[Chemical Formula 2]

in Chemical Formula 2, $Q^1$ and $Q^2$ are the same as or different from each other, and are each independently substituted or unsubstituted C1 to C20 alkyl, substituted or unsubstituted C1 to C10 alkoxy, substituted or unsubstituted C2 to C20 alkoxyalkyl, or substituted or unsubstituted C6 to C20 aryl;

A is at least one radical containing carbon, germanium, or silicon atom;

$M^2$ is a Group 4 transition metal;

$X^1$ and $X^2$ are the same as or different from each other, and are each independently a halogen, substituted or unsubstituted C1 to C20 alkyl, substituted or unsubstituted C2 to C10 alkenyl, substituted or unsubstituted C7 to C40 alkylaryl, substituted or unsubstituted C7 to C40 arylalkyl, substituted or unsubstituted C6 to C20 aryl, substituted or unsubstituted C1 to C20 alkylidene, a substituted or unsubstituted amino group, substituted or unsubstituted C2 to C20 alkylalkoxy, or substituted or unsubstituted C7 to C40 arylalkoxy;

$R^1$ to $R^{16}$ are the same as or different from each other, and are each independently hydrogen, a halogen, substituted or unsubstituted C1 to C20 alkyl, substituted or unsubstituted C2 to C20 alkenyl, substituted or unsubstituted C1 to C20 alkylsilyl, substituted or unsubstituted C1 to C20 silylalkyl, substituted or unsubstituted C1 to C20 alkoxysilyl, substituted or unsubstituted C1 to C10 alkoxy, substituted or unsubstituted C2 to C20 alkoxyalkyl, substituted or unsubstituted C6 to C20 aryl, substituted or unsubstituted C6 to C10 aryloxy, substituted or unsubstituted C7 to C40 alkylaryl, substituted or unsubstituted C7 to C40 arylalkyl, substituted or unsubstituted C8 to C40 arylalkenyl, or substituted or unsubstituted C2 to C10 alkynyl, and two or more substituents adjacent to each other of $R^1$ to $R^{16}$ are optionally connected with each other to form a substituted or unsubstituted aliphatic or aromatic ring; and at least one of $R^1$ to $R^8$ is represented by the following Chemical Formula 3, and at least one of $R^9$ to $R^{16}$ is represented by the Chemical Formula 3, $$-L^1-D^1$$ [Chemical Formula 3]

in Chemical Formula 3, $L^1$ is C1 to C10 alkylene, and $D^1$ is C6 to C20 aryl, C4 to C20 cycloalkyl, or C2 to C20 alkoxyalkyl wherein the cocatalyst is at least one selected from the group consisting of compounds represented by the following Chemical Formulae 4 and 5:

$$R^c—[Al(R^d)—O_l]_m—R^e$$ [Chemical Formula 4]

in Chemical Formula 4, $R^c$, $R^d$, and $R^e$ are the same as or different from each other, and are each independently hydrogen, a halogen, a C1 to C20 hydrocarbyl group, or a C1 to C20 hydrocarbyl group substituted with a halogen;

l is 1; and m is an integer of 2 or more;

$$T^+[BG_4]^-$$ [Chemical Formula 5]

in Chemical Formula 5, $T^+$ is a polyatomic ion having a valence of +1, B is boron in +3 oxidation state, and G are each independently selected from the group consisting of hydride, dialkylamido, halide, alkoxide, aryloxide, hydrocarbyl, halocarbyl and halo-substituted hydrocarbyl, provided that G has 20 or less carbon.

2. The method for preparing a polyolefin according to claim 1, wherein $M^1$ is Ti, Zr or Hf;

$R^a$ and $R^b$ are each independently hydrogen, C1 to C20 alkyl, C2 to C20 alkoxyalkyl, or C7 to C40 arylalkyl; and $Z^1$ is a halogen.

3. The method for preparing a polyolefin according to claim 1, wherein the first metallocene compound represented by the Chemical Formula 1 is bis(3-(6-(tert-butoxy)

hexyl)-1H-inden-1-yl)zirconium(IV) chloride or bis(3-(6-(tert-butoxy)hexyl)-4,5,6,7-tetrahydro-1H-inden-1-yl) zirconium(IV) chloride.

4. The method for preparing a polyolefin according to claim 1, $M^2$ is Ti, Zr or Hf;

A is carbon, germanium, or silicon;

$Q^1$ and $Q^2$ are the same as or different from each other, and are each independently C1 to C20 alkyl, or C2 to C20 alkoxyalkyl;

$R^2$ or $R^7$ is represented by the following Chemical Formula 3a, $R^{10}$ or $R^{15}$ is represented by the following Chemical Formula 3a, and the rest of $R^1$ to $R^{16}$ are hydrogen, a halogen, or C1 to C20 alkyl; and $X^1$ and $X^2$ are the same as or different from each other, and are each independently a halogen, -$L^2$-$D^2$   [Chemical Formula 3a]

in Chemical Formula 3a, $L^2$ is C1 to C10 alkylene, and $D^2$ is C6 to C20 aryl, or C4 to C20 cycloalkyl.

5. The method for preparing a polyolefin according to claim 1, wherein the second metallocene compound represented by the Chemical Formula 2 is dichloro[[[6-(tert-butoxy)hexyl]methylsilylene]bis[(4a,4b,8a,9,9a-η)-2-(cyclopentylmethyl)-9H-fluoren-9-ylidene]] zirconium, dichloro[[[6-(tert-butoxy)hexyl]methylsilylene]bis[(4a,4b,8a,9,9a-η)-2-(phenylmethyl)-9H-fluoren-9-ylidene]] zirconium, or dichloro[[[6-(tert-butoxy)hexyl]methylsilylene]bis[(4a,4b,8a,9, 9a-η)-2-(cyclohexylmethyl)-9H-fluoren-9-ylidene]] zirconium.

6. The method for preparing a polyolefin according to claim 1, wherein the support comprises at least one selected from the group consisting of silica, alumina and magnesia.

7. The method for preparing a polyolefin according to claim 1, wherein the cocatalyst represented by the Chemical Formula 4 is an alkylaluminoxane-based compound selected from the group consisting of methyl aluminoxane, ethyl aluminoxane, isobutyl aluminoxane and butyl aluminoxane.

8. The method for preparing a polyolefin according to claim 1, wherein the cocatalyst represented by the Chemical Formula 5 is a borate-based compound in the form of tri-substituted ammonium salts selected from the group consisting of trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecycloctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentafluorophenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl) ammonium tetrakis(pentafluorophenyl)borate, tri(sec-butyl) ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis (pentafluorophenyl)borate, trimethylammonium tetrakis (2,3,4,6-tetrafluorophenyl)borate, triethylammonium tetrakis (2,3,4,6-tetrafluorophenyl)borate, tripropylammonium tetrakis (2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl) borate, N,N-diethylanilinium tetrakis(2,3,4,6-tetrafluorophenyl)borate and N,N-dimethyl-(2,4,6-trimethylanilinium) tetrakis-(2,3,4,6-tetrafluorophenyl)borate; a borate-based compound in the form of dialkyl ammonium salts selected from the group consisting of dioctadecyl ammonium tetrakis (pentafluorophenyl)borate, ditetradecylammonium tetrakis (pentafluorophenyl)borate and dicyclohexylammonium tetrakis(pentafluorophenyl)borate; or a borate-based compound in the form of tri-substituted phosphonium salts selected from the group consisting of triphenylphosphonium tetrakis(pentafluorophenyl)borate, methyldioctadecylphosphonium tetrakis(pentafluorophenyl)borate and tri(2,6-dimethylphenyl)phosphonium tetrakis(pentafluorophenyl)borate.

9. The method for preparing a polyolefin according to claim 1, wherein the olefinic monomers comprise at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methyl styrene, divinylbenzene, and 3-chloromethyl styrene.

10. The method for preparing a polyolefin according to claim 1, wherein the at least one first metallocene compound and the at least one second metallocene compound are included in a molar ratio of about 1:1 to 1:3 or about 1:1 to 1:2.

11. The method for preparing a polyolefin according to claim 1, wherein a weight ratio of the cocatalyst used to the support is 1:1 to 1:100.

12. The method for preparing a polyolefin according to claim 1, wherein the polyolefin is a homopolymer.

13. The method for preparing a polyolefin according to claim 1, wherein the trialkylaluminum is trimethylaluminum, triethylaluminum, triisobutylaluminum, trihexylaluminum, trioctylaluminum or isoprenylaluminum.

\* \* \* \* \*